US011984954B2

(12) United States Patent
Faxér et al.

(10) Patent No.: US 11,984,954 B2
(45) Date of Patent: May 14, 2024

(54) SYSTEMS AND METHODS FOR FLEXIBLE TRIGGERING OF CSI REPORTS

(71) Applicant: Telefonaktiebolaget LM Ericsson (publ), Stockholm (SE)

(72) Inventors: Sebastian Faxér, Stockholm (SE); Mattias Frenne, Uppsala (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 17/764,024

(22) PCT Filed: Oct. 1, 2020

(86) PCT No.: PCT/IB2020/059224
§ 371 (c)(1),
(2) Date: Mar. 25, 2022

(87) PCT Pub. No.: WO2021/064641
PCT Pub. Date: Apr. 8, 2021

(65) Prior Publication Data
US 2022/0352950 A1 Nov. 3, 2022

Related U.S. Application Data

(60) Provisional application No. 62/908,997, filed on Oct. 1, 2019.

(51) Int. Cl.
*H04B 7/06* (2006.01)
*H04W 24/08* (2009.01)
*H04W 72/23* (2023.01)
(52) U.S. Cl.
CPC .......... *H04B 7/0626* (2013.01); *H04W 24/08* (2013.01); *H04W 72/23* (2023.01)

(58) Field of Classification Search
CPC .. H04B 7/0626; H04B 7/0639; H04B 7/0632; H04W 72/23; H04W 24/08; H04W 24/00; H04L 1/0026
See application file for complete search history.

(56) References Cited

U.S. PATENT DOCUMENTS

2018/0324797 A1* 11/2018 Hosseini ............... H04L 5/0057
2019/0098523 A1* 3/2019 Muruganathan ...... H04L 5/0082
2019/0159219 A1 5/2019 Hosseini et al.

FOREIGN PATENT DOCUMENTS

WO 2019103562 A1 5/2019

OTHER PUBLICATIONS

Author Unknown, "Technical Specification Group Radio Access Network; NR; Physical layer procedures for data (Release 15)," Technical Specification 38.214, Version 15.7.0, Sep. 2019, 3GPP Organizational Partners, 106 pages.
(Continued)

*Primary Examiner* — Khanh C Tran
(74) *Attorney, Agent, or Firm* — Withrow & Terranova, PLLC

(57) ABSTRACT

Systems and methods for flexible triggering of Channel State Information (CSI) reports are provided. A method performed by a wireless device for transmitting a CSI report according to a timeline requirement includes one or more of: determining to enable timeline switching; receiving an instruction to determine a first CSI report; determining to stop determining an existing ongoing second CSI report; determining the first CSI report; and transmitting the first CSI report. In this way, some embodiments allow ultra-low latency CSI reporting also for the cases when the wireless device is already in the ongoing process of determining a CSI report. In some embodiments, Ultra-Reliable Low-Latency Communication (URLLC) CSI reports are allowed to "override" previous CSI calculations. Some embodiments
(Continued)

achieve more flexible triggering of URLLC CSI reports so that the ultra-low latency CSI timeline can be applied for more cases, reducing the CSI latency and resulting in more reliable URLLC scheduling.

20 Claims, 21 Drawing Sheets

(56) References Cited

OTHER PUBLICATIONS

Ericsson, "R1-1809196: Maintenance for CSI acquisition," 3GPP TSG-RAN WG1 Meeting #94, Aug. 20-24, 2018. Goteborg, Sweden, 9 pages.

Qualcomm Incorporated, "R1-1903804: Summary for Potential Enhancements to Scheduling/HARQ/CSI Processing Timeline, " 3GPP TSG-RAN WG1 Meeting #96, Feb. 25-Mar. 1, 2019, Athens, Greece, 52 pages.

International Search Report and Written Opinion for International Patent Application No. PCT/IB2020/059224, dated Nov. 20, 2020, 19 pages.

\* cited by examiner

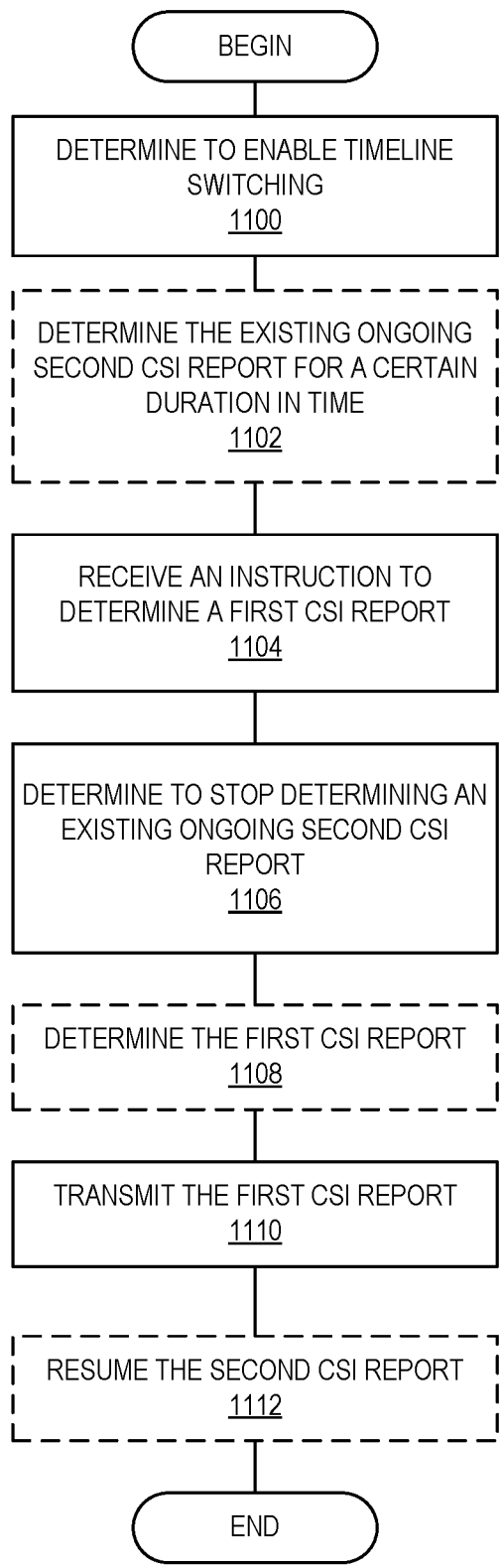
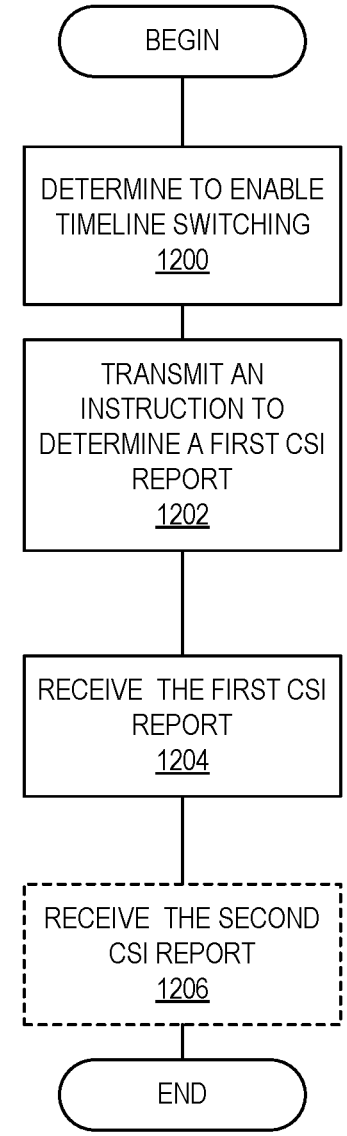
FIG. 11
FIG. 12

SYSTEMS AND METHODS FOR FLEXIBLE TRIGGERING OF CSI REPORTS

RELATED APPLICATIONS

This application is a 35 U.S.C. § 371 national phase filing of International Application No. PCT/IB2020/059224, filed Oct. 1, 2020, which claims the benefit of provisional patent application Ser. No. 62/908,997, filed Oct. 1, 2019, the disclosures of which are hereby incorporated herein by reference in their entireties.

TECHNICAL FIELD

The present disclosure relates to triggering of Channel State Information (CSI) reports.

BACKGROUND

Multi-antenna techniques can significantly increase the data rates and reliability of a wireless communication system. The performance is particularly improved if both the transmitter and the receiver are equipped with multiple antennas, which results in a Multiple-Input Multiple-Output (MIMO) communication channel. Such systems and/or related techniques are commonly referred to as MIMO.

The New Radio (NR) standard is currently evolving with enhanced MIMO support. A core component in NR is the support of MIMO antenna deployments and MIMO related techniques like, for instance, spatial multiplexing. The spatial multiplexing mode aims for high data rates in favorable channel conditions. An illustration of the spatial multiplexing operation is provided in FIG. 1.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer, and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

NR uses Orthogonal Frequency Division Multiplexing (OFDM) in the downlink (and Discrete Fourier Transform (DFT) precoded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to a User Equipment (UE).

In closed-loop precoding for the NR downlink, the UE transmits, based on channel measurements in the forward link (downlink), recommendations to the gNB of a suitable precoder to use. The gNB configures the UE to provide feedback according to CSI-ReportConfig and may transmit a Channel State Information-Reference Signal (CSI-RS) and configure the UE to use measurements of the CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g., several precoders, one per subband. This is an example of the more general case of Channel State Information (CSI) feedback, which also encompasses feeding back other information than recommended precoders to assist the New Radio Base Station (gNB) in subsequent transmissions to the UE. Such other information may include Channel Quality Indicators (CQIs) as well as a transmission Rank Indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 PRBs depending on the Bandwidth Part (BWP) size.

Given the CSI feedback from the UE, the gNB determines the transmission parameters it wishes to use to transmit to the UE, including the precoding matrix, transmission rank, and Modulation and Coding Scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

The embodiments presented in this disclosure may be used with two-dimensional antenna arrays, and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus: $N = N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port. Although vertical and horizontal dimensions are used here, the antenna can be in any other orientation in practice.

An example of a 4×4 array with cross-polarized antenna elements is illustrated in FIG. 2.

Precoding a signal may be interpreted as multiplying the signal with different beamforming weights for different antennas prior to transmission. The beamforming weights are the precoder elements. A typical approach is to tailor the precoder to the antenna form factor, i.e., taking into account $N_h$, $N_v$ and $N_p$ when designing the precoder codebook.

For CSI measurement and feedback, CSI-RS are defined. A CSI-RS is transmitted on each transmit antenna (or antenna port) and is used by a UE to measure downlink channel between each of the transmit antenna ports and each of its receive antenna ports. The antenna ports are also referred to as CSI-RS ports. The supported numbers of antenna ports in NR are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain Resource Elements (Res) in a slot and certain slots. FIG. 3 shows an example of CSI-RS REs for 12 antenna ports, where one RE per Resource Block (RB) per port is shown.

In addition, an Interference Measurement Resource (IMR) is also defined in NR for a UE to measure interference. An IMR resource contains four REs, either four adjacent REs in a frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI, i.e., rank, precoding matrix, and the channel quality.

Furthermore, a UE in NR may be configured to measure interference based on one or multiple NZP CSI-RS resources.

CSI framework in NR: In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report, either periodically, semi-persistently or aperiodically (triggered by the network).

Each CSI reporting setting contains at least the following information:
A CSI-RS resource set for channel measurement
An IMR resource set for interference measurement
Optionally, a CSI-RS resource set for interference measurement
Time-domain behavior, i.e., periodic, semi-persistent, or aperiodic reporting
Frequency granularity, i.e., wideband or subband
CSI parameters to be reported such as RI, PMI, CQI, and CSI-RS Resource Indicators (CRIs) in case of multiple CSI-RS resources in a resource set
Codebook types, i.e., type I or II, and possible codebook subset restriction
Measurement restriction enabled or disabled
Subband size. One out of two possible subband sizes is indicated, the value range for a subband size depends on the configured bandwidth of the downlink Bandwidth Part (BWP). One CQI/PMI (if configured for subband reporting) is fed back per subband.

When the CSI-RS resource set in a CSI reporting setting contains multiple CSI-RS resources, one of the CSI-RS resources is selected by a UE and a CRI is also reported by the UE to indicate to the gNB about the selected CSI-RS resource in the resource set, together with RI, PMI and CQI associated with the selected CSI-RS resource. The network may then transmit the different CSI-RS resources using different MIMO precoders or by using different beam directions.

For aperiodic CSI reporting in NR, more than one CSI reporting setting, each with a different CSI-RS resource set for channel measurement and/or different resource set for interference measurement can be configured and triggered at the same time, i.e., with a single trigger command in the downlink control channel from the gNB to the UE. In this case, multiple CSI reports are measured, computed, aggregated and sent from the UE to the gNB in a single PUSCH message.

As a general classification, NR categorizes a CSI Report Setting into wideband and subband frequency-granularity as follows:
wideband PMI/CQI reporting, beam reporting, hybrid CSI report, semi-open loop reporting and non-PMI feedback (with wideband CQI) is classified as wideband frequency-granularity CSI, whereas
the other configuration of a CSI Report Setting is classified as having a subband frequency-granularity.

Only CSI Report Settings with wideband frequency-granularity is allowed to be periodically reported on short PUCCH.

Aperiodic CSI-RS/IM and CSI reporting: For both aperiodic CSI-RS/IM resources and aperiodic CSI reports, the triggering is done jointly by transmitting a Downlink Channel Information (DCI) Format 0_1 from the gNB to the UE, using the downlink control channel, a Physical Downlink Control Channel (PDCCH). This is the DCI format which schedules PUSCH transmission where the aperiodic CSI report is to be carried. The DCI Format 0_1 contains a CSI request field which can be configured to be between zero and six bits wide using higher layer configuration (i.e., Radio Resource Control (RRC)) from gNB to UE.

The CSI request field can thus contain at most $S_c=2^6=64$ codepoints. If this field is set to all zeros, no CSI is requested, and the DCI 0_1 only schedules a regular Physical Uplink Shared Channel (PUSCH) transmission containing Uplink (UL) data. A non-zero codepoint on the other hand points to a so-called aperiodic trigger state configured by RRC from gNB to UE. An aperiodic trigger state is defined as a list of up to at most 16 aperiodic CSI Report Settings, each identified by a CSI Report Setting ID, (but typically, a much lower number of report settings is used) for which the UE simultaneously should calculate CSI for and include in the scheduled PUSCH transmission.

If a CSI Report Setting is linked with periodic/semi-persistent Resource Setting(s), no further information is needed since there is only one Resource Set included in the Resource Setting for channel/interference measurement in this case.

However, if the CSI Report Setting is linked with an aperiodic Resource Setting (which can comprise multiple Resource Sets), which CSI-RS/IM Resource set should be used for measurement must be indicated in DCI 0_1. Hence, this allows the gNB, for a given CSI Report Setting, to dynamically switch which CSI-RS/IM resource shall be used for measurement each time the aperiodic report is triggered by DCI 0_1, by configuring by RRC and indicating by DCI 0_1 different aperiodic trigger states. This means that the aperiodic NZP CSI-RS Resource Set for channel measurement, the aperiodic CSI-IM Resource Set for interference measurement (if that is used) and the aperiodic NZP CSI-RS Resource Set for interference measurement (if used) to use for a given CSI Report Setting are also included in the aperiodic trigger state definition.

For aperiodic NZP CSI-RS, the Quasi Co-Location (QCL) source to use (i.e., the Transmission Configuration Indicator (TCI) state) is also configured in the aperiodic trigger state, which enables the gNB to dynamically switch UE Rx beam assumptions for the reception of the NZP CSI-RS. The aperiodic trigger state definition is illustrated in FIG. 4.

It is possible to configure up to 128 aperiodic trigger states via RRC. However, the number of codepoints of the CSI request bitfield in DCI 0_1 only ranges between 0-63. Therefore, it is possible that more trigger states are configured in RRC than can be indicated with the DCI field. When this is the case, i.e., M aperiodic trigger states are configured in RRC but the CSI request bitfield (with bitwidth $N_{TS}=0, \ldots, 6$) only contains $S_c=2^{N_{TS}}-1<M$ non-zero codepoints, an intermediary sub-selection, or mapping, between the $S_c$ codepoints and the M RRC configured trigger states needs to be performed. This sub-selection is performed by transmitting a MAC CE sub-selection command.

The aperiodic CSI-RS/IM is essentially a one-shot measurement which is only present for a single time instance and is only used to determine CSI for a single aperiodic report. The position, in time, of the aperiodic CSI-RS/Interference Management (IM) is defined as a slot offset relative to the slot where the DCI containing the trigger was received. The slot offset is defined on a CSI-RS resource set level and the offset allows the UE to use some time to complete the CSI measurements and calculation of the reports and prepare the uplink transmission of the reports. For aperiodic CSI-IM, there is no explicit slot offset defined but rather it is assumed that the CSI-IM and CSI-RS is present in the same slot to enable efficient CSI processing at the UE.

CSI processing criteria and UE capability for CSI reporting: In Long Term Evolution (LTE), the concept of a CSI process was introduced in Rel-11 for the purpose of supporting Coordinated Multi Point (CoMP), i.e., feedback of several different CSI reports corresponding to multiple transmission points. Each CSI process was associated with a specific kind of reporting configuration (i.e., CSI content and measurement resources) and the UE is assumed to always be able to provide CSI for all its supported CSI processes on a carrier. Thus, for LTE, the CSI computation capability reported by the UE is the support of a number X of reporting configurations. However, such a tight coupling between CSI capability and configured reporting configurations X is not suitable for the more flexible NR CSI framework.

Instead, the NR CSI computation capability separates the number of supported configured CSI Report Settings and the number of supported simultaneous CSI calculations. That is, the concept of CSI process is generalized in NR with the introduction of the CSI Processing Unit (CPU), where the number of CPUs is equal to the number of simultaneous CSI calculations supported by the UE. The CPU can be seen as a generic CSI calculation engine, which can process any kind of CSI report. That is, the CPUs are a pool of computational resources. For instance, the UE can indicate support for four configured CSI Report Settings but only support a single simultaneous CSI calculation (i.e., supporting a single CPU). This means that the gNB can trigger any of the four different CSI reports, but has to multiplex the different CSI reports calculations in time. The different configured CSI report settings may, for instance, correspond to different codebook configurations (i.e., Type I and Type II codebooks), different types of beam reports (e.g., P2 and P3), and different CSI hypotheses used in CoMP operation or CSI reports corresponding to different carriers.

The framework works as follows. When calculation of a CSI report is about to proceed, i.e., either when the UE gets triggered with an aperiodic CSI report or when the computation starts for a periodic or semi-persistent CSI report, the CSI report is allocated to one or multiple available CPU(s). If there are not enough CPUs available due to that, the UE already has ongoing processing of other CSI reports; an additional CSI reporting allocated by the gNB does not have to be calculated by the UE, and the UE can instead report stale CSI to the gNB, such as a previously calculated CSI report stored in memory or simply padding the CSI report with dummy bits. The CSI report is not dropped in this case, but some content is always transmitted in order to not change the rate matching procedures for the PUSCH or Physical Uplink Control Channel (PUCCH) transmission, which could be error prone. In practice, the gNB should strive for only triggering/configuring as many CSI reports as the UE is capable of handling so that stale CSI does not need to be reported by the UE.

Each CSI report that is committed for calculation by the UE thus occupies a number $O_{CPU}$ CPUs from a starting allocation time until the last symbol of the physical channel (i.e., PUCCH or PUSCH) carrying the CSI report to the gNB has finished transmitting from the UE, whereby the $O_{CPU}^{(n)}$ CPUs are then released. For aperiodic CSI reports, the starting allocation time of the CPU(s) is the last symbol of the PDCCH containing the DCI which triggered the report, while for periodic and semi-persistent CSI reports, the CPUs are allocated from the time of the occurrence of the latest CSI-RS/IM resource used to calculate the particular report. That is, for periodic/semi-persistent reports, the UE can be assumed to start calculation of the CSI report as soon as it has received the latest occurrence of the measurement resource.

The number of CPUs $O_{CPU}$ occupied by a certain CSI report depends on the content of the report. For non-beam related CSI reports (i.e., when the reportQuantity is not equal to 'cri-RSRP', 'ssb-Index-RSRP' or 'none'), the CSI report occupies as many CPUs as the number of CSI-RS resources in the CSI-RS resource set for channel measurement. This is because a UE may, in the worst case, need to calculate a complete CSI report for each CSI-RS resource in parallel in order to determine which CSI-RS resource is optimal and shall be selected with the Channel State Information Reference Signal Resource Index (CRI) (of course, a UE implementation may use simpler approaches to determine the CRI, such as comparing the signal strength of the resources). For beam-related reports, on the other hand, the required computations are not as complex and only a single CPU ($O_{CPU}=1$) is occupied, even if multiple CSI-RS resources are included in the CSI-RS resource set for channel measurement. The gNB also has the possibility to trigger an aperiodic Tracking Reference Signal (TRS) using the triggering mechanisms of the CSI framework; however, this does not occupy any CPUs, and it is instead assumed that the UE has dedicated resources for TRS processing.

If multiple CSI reports are about to be allocated to use CPUs on a given OFDM symbol, they are ordered according to a set of priority rules. That is, if N CSI reports start occupying their respective CPUs on the same OFDM symbol on which $N_{CPU}-L$ CPUs are unoccupied, where each CSI report $n=0, \ldots, N-1$ corresponds to $O_{CPU}$, the UE is not required to update the N−M requested CSI reports with lowest priority where $0 \leq M \leq N$ is the largest value such that $\sum_{n=0}^{M-1} O_{CPU}^{(n)} \leq N_{CPU}-L$ holds.

The concept of CPU occupation is illustrated in FIG. 5, where the UE is assumed to have two CPUs available, and where CPU #1 gets allocated by the periodic (P) CSI report in slot 0, which is the slot of the latest NZP CSI-RS occurrence (no later than the CSI reference resource) used by the P CSI report. While the P CSI report is calculated, the UE gets triggered with two consecutive aperiodic CSI reports, #1 and #2, which are allocated to CPU #2. After both CPUs are released, the UE gets triggered with two simultaneous aperiodic CSI reports, #3 and #4, which respectively occupies CPU #1 and CPU #2. Before these CSI reports have finished calculating, the UE gets triggered with another aperiodic CSI report, #5. However, since there are no more CPUs available, that CSI report is not computed by the UE and instead stale or dummy CSI is reported for aperiodic CSI report #5.

CSI timeline requirement: When aperiodic CSI reports are triggered by PDCCH, not only does the UE need to have available computational resources to calculate the report, as was described in the previous section, it also needs enough time to perform the computation. In LTE, scheduling of PUSCH, where aperiodic CSI is carried, used a fixed scheduling offset of four subframes, corresponding to 4 ms and it was assumed that any triggered aperiodic CSI report could be calculated during this time period and no additional timing requirement for CSI was needed. However, since NR features both a more diverse set of CSI content with different computational complexities, as well as flexible scheduling offset of the uplink transmissions to carry the CSI report, a separate CSI timeline requirement is needed to ensure that the PUSCH carrying the CSI is not scheduled too aggressively.

The CSI reports (i.e., each CSI report Setting) are classified into three Latency Classes, each with different timing requirements. Low Latency CSI is classified as CSI which fulfils the following criteria:
Wideband frequency-granularity
A single CSI-RS resource (i.e., no CRI reporting) with at most four CSI-RS ports
PMI reporting with Type I SinglePanel codebook or non-PMI reporting The remaining type of CSI content requires more computations, and is classified as High Latency CSI (excluding beam reporting) while beam reporting is defined as a separate (i.e., the third) CSI Latency Class.

Two timing requirements for aperiodic CSI reporting are defined in NR. The first requirement is defined as the minimum number of OFDM symbols Z between the last symbol of the PDCCH triggering the aperiodic CSI report and the first symbol of the PUSCH which carries the CSI report. During this time, the UE needs to be able to decode the PDCCH, perform possible CSI-RS/IM measurements (if it does not already have an up-to-date previous channel/interference measurement stored in its memory), perform possible channel estimation, calculate the CSI report, and perform Uplink Channel Information (UCI) multiplexing with an Uplink Shared Channel (UL-SCH).

However, if aperiodic CSI-RS/IM is used with the aperiodic CSI report, this first requirement alone does not guarantee that that the UE has sufficient time to compute the CSI, since the aperiodic CSI-RS could potentially be triggered close to the allowed time occasions for the PUSCH transmission (i.e., just after the period indicated by Z). Therefore, the second requirement is defined as the minimum number of OFDM symbols Z' between the last symbol of the aperiodic CSI-RS/IM used to calculate the report and the first symbol of the PUSCH which carries the CSI report. This is illustrated in FIG. 6.

The numerical values for timeline requirements (Z, Z') for the three CSI Latency classes is given in Table 1, for each subcarrier configuration $\mu$ (where $\mu$ is counted in the smallest Subcarrier Spacing (SCS) if different numerologies are used for PDCCH, PUSCH and/or CSI-RS). In practice, the only difference between the Z and Z' timing requirements is that the Z requirement should additionally encompass DCI decoding time, which is why the Z is typically a few symbols larger than the corresponding Z' value.

For Low/High Latency CSI Classes, the timeline requirement is fixed in specification while the timeline requirement for beam reporting depends on the UE's reported capability on beam report timing ($X_\mu$) and beam switch timing ($KB_i$). If the CSI report is multiplexed with UL-SCH, some additional OFDM symbols are added to the requirement to account for UCI and UL-SCH multiplexing time. If more than one CSI Report Setting is aperiodically triggered by a PDCCH, then the largest (Z, Z') values across different reports are used for all the CSI reports. That is, if one High Latency is triggered and one Low Latency CSI report is triggered, the High Latency CSI timing requirement is used.

TABLE 1

Timing requirement for Low Latency CSI, High Latency CSI and Beam reports

| $\mu$ | Low Latency CSI [symbols] | | High Latency CSI [symbols] | | Beam reporting [symbols] | |
|---|---|---|---|---|---|---|
| | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 \pm KB_1$) | $X_3$ |
| 3 | 97 | 85 | 152 | 140 | min(97, $X_4 \pm KB_2$) | $X_4$ |

If the Z-criterion (or Z'-criterion) is not fulfilled and the gNB triggers the PUSCH too close to the PDCCH (or the aperiodic CSI-RS/IM), the UE can simply ignore the scheduling DCI if the UE is not also scheduled with UL-SCH or HARQ-ACK and not transmit anything. If a UL-SCH or Hybrid Automatic Repeat Request Acknowledgement (HARQ-ACK) needs to be multiplexed on the PUSCH, however, the UE still transmits the PUSCH but pads the CSI report with dummy bits or transmits a stale CSI report.

Additionally, there is a special requirement for ultra-low latency CSI with a very short timeline. This type of CSI report is useful for Ultra-Reliable Low-Latency Communication (URLLC) type of applications where an "instant" CSI report may be required to be able to quickly schedule e.g., high priority data. Since this timing requirement is very aggressive, it is only applied if a single Low Latency CSI report is triggered without multiplexing with either a UL-SCH or HARQ-ACK and only when the UE has all of its CPUs unoccupied. The UE can then allocate all of its computational resources to compute this CSI in a very short time. Hence, all of the CPUs become occupied for this duration and the UE cannot calculate any other CSI during this time. The ultra-low latency timing requirement is given in Table 2.

TABLE 2

Ultra-low latency CSI timing requirement

| | $Z_1$ [symbols] | |
|---|---|---|
| $\mu$ | $Z_1$ | $Z'_1$ |
| 0 | 10 | 8 |
| 1 | 13 | 11 |
| 2 | 25 | 21 |
| 3 | 43 | 36 |

If the UE is triggered with a single Low Latency CSI report without multiplexing with a UL-SCH and/or HARQ-ACK, but where at least one CPU is already occupied, the less stringent requirement on latency according to Table 1 is applied. Improved systems and methods for triggering CSI reports are needed.

SUMMARY

Systems and methods for flexible triggering of Channel State Information (CSI) reports are provided. In some embodiments, a method performed by a wireless device for transmitting a CSI report according to a timeline requirement includes one or more of: determining to enable timeline switching; receiving, from a network node, an instruction to determine a first CSI report; responsive to determining to enable timeline switching and receiving the instruction to determine the first report, determining to stop determining an existing ongoing second CSI report; determining the first CSI report; and transmitting, to the network node, the first CSI report. In this way, some embodiments of the current disclosure allow ultra-low latency CSI reporting also for the cases when the wireless device is already in the ongoing process of determining a CSI report, e.g., for mobile broadband service. In some embodiments, Ultra-Reliable Low-Latency Communication (URLLC) CSI reports are allowed to "override" previous CSI calculations and thus allocate all CSI computation resources for the URLLC CSI report to achieve and maintain a faster CSI timeline. Some embodiments achieve more flexible triggering of URLLC CSI reports so that the ultra-low latency CSI timeline can be applied for more cases, which reduces the CSI latency and in turn results in more reliable URLLC scheduling.

Certain aspects of the present disclosure and their embodiments may provide solutions to some or all of the aforementioned or other challenges. There are, proposed herein, various embodiments which address one or more of the issues disclosed herein. Systems and methods for flexible triggering of CSI reports are provided. In some embodiments, a method performed by a wireless device for transmitting a CSI report according to a timeline requirement comprises one or more of: determining to enable timeline switching; receiving, from a network node, an instruction to calculate a first CSI report; responsive to receiving the higher layer configuration to enable timeline switching, and also receiving the instruction to calculate the first report, determining to stop calculating an existing ongoing second CSI report; and transmitting, to the network node, the first CSI report. In this way, some embodiments of the current disclosure allow ultra-low latency CSI reporting also for the cases when the UE is already in the ongoing process of calculating a CSI report, e.g., for mobile broadband service. In some embodiments, URLLC CSI reports are allowed to "override" previous CSI calculations and thus allocate all CSI computation resources for the URLLC CSI report to achieve and maintain a faster CSI timeline. Some embodiments achieve more flexible triggering of URLLC CSI reports so that the ultra-low latency CSI timeline can be applied for more cases, which reduces the CSI latency and in turn results in more reliable URLLC scheduling.

In some embodiments, the method further comprises the step of calculating the existing ongoing second CSI report for a certain duration in time.

In some embodiments, the first CSI report has a lower latency requirement than the second CSI report.

In some embodiments, determining to enable timeline switching comprises receiving, from the network node, a higher layer configuration to enable timeline switching.

In some embodiments, receiving the instruction to calculate the first CSI report comprises receiving the instruction to calculate the first CSI report from Downlink Control Information (DCI) signaling.

In some embodiments, the higher layer configuration to enable timeline switching is received explicitly or implicitly.

In some embodiments, determining to enable timeline switching comprises determining to enable timeline switching based on the received instruction to calculate the first CSI report.

In some embodiments, receiving the instruction to calculate the first CSI report comprises a slot offset $K_2$ that indicates when to report the first CSI report;

and/or determining to stop calculating the existing ongoing second CSI report comprises determining to suspend calculation of the existing ongoing second CSI report.

In some embodiments, the method further comprises resuming the second CSI report.

In some embodiments, resuming the second CSI report comprises resuming the second CSI report based on a modified timeline criterion that depends on the slot offset $K_2$.

In some embodiments, the slot offset $K_2$ indicates when to report the first CSI report on Physical Uplink Shared Channel (PUSCH) relative to the instruction to calculate the first CSI report.

In some embodiments, the first CSI report comprises a URLLC CSI report.

In some embodiments, a method performed by a base station for receiving a CSI report according to a timeline requirement comprises one or more of: determining to enable timeline switching; transmitting, to a wireless device, an instruction to calculate a first CSI report; and receiving, from the wireless device, the first CSI report, where the wireless device stopped calculating an existing ongoing second CSI report.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 11 illustrates an example embodiment where a wireless device determines to enable timeline switching, according to some embodiments of the present disclosure;

FIG. 12 illustrates an example embodiment where a base station determines to enable timeline switching, according to some embodiments of the present disclosure;

DETAILED DESCRIPTION

Figure 1:
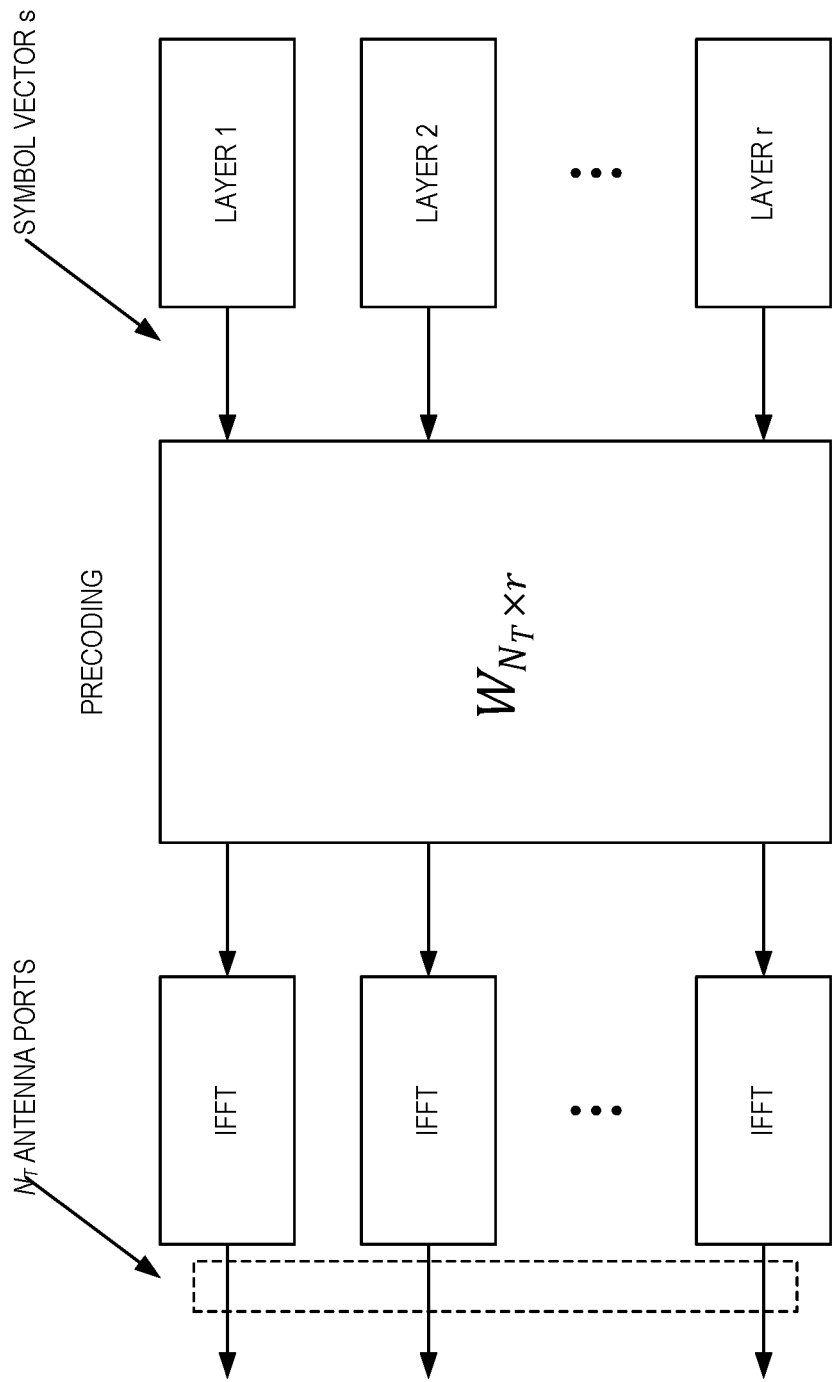
FIG. 1 illustrates a spatial multiplexing operation.
Figure 2:
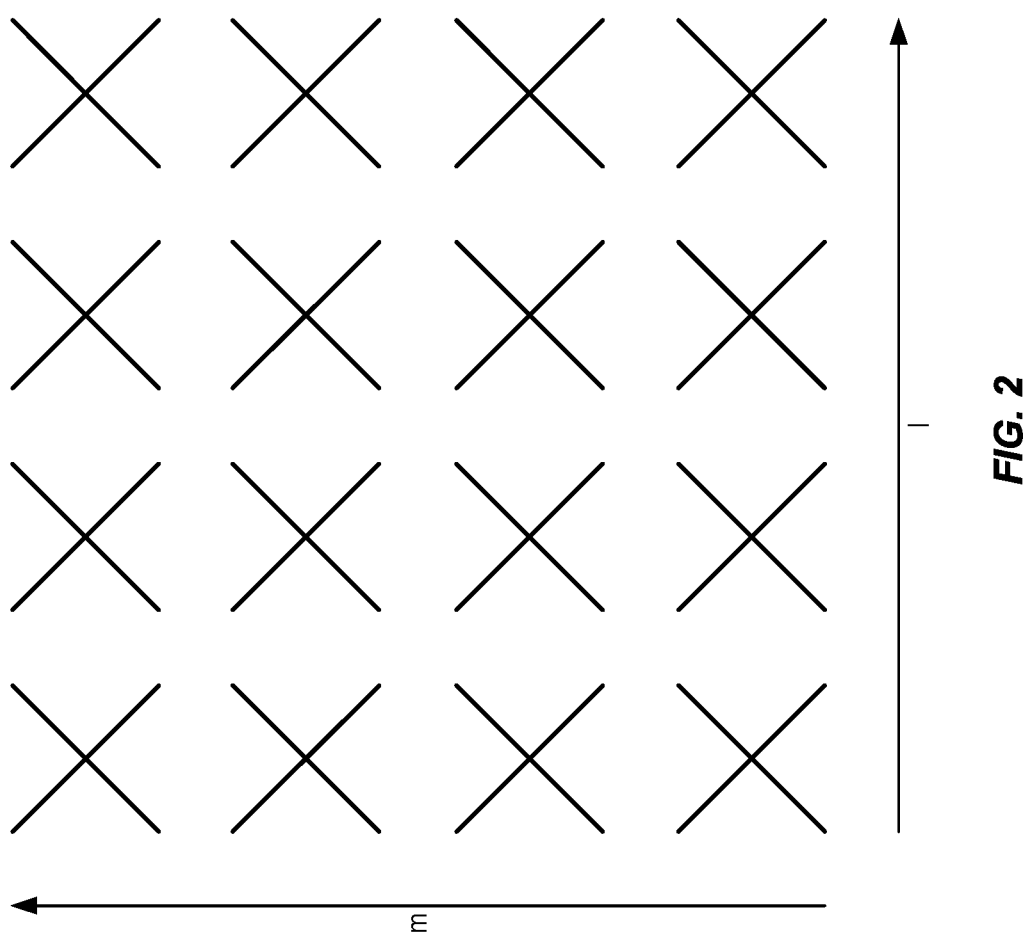
FIG. 2 illustrates a 4×4 array with cross-polarized antenna elements.
Figure 3:
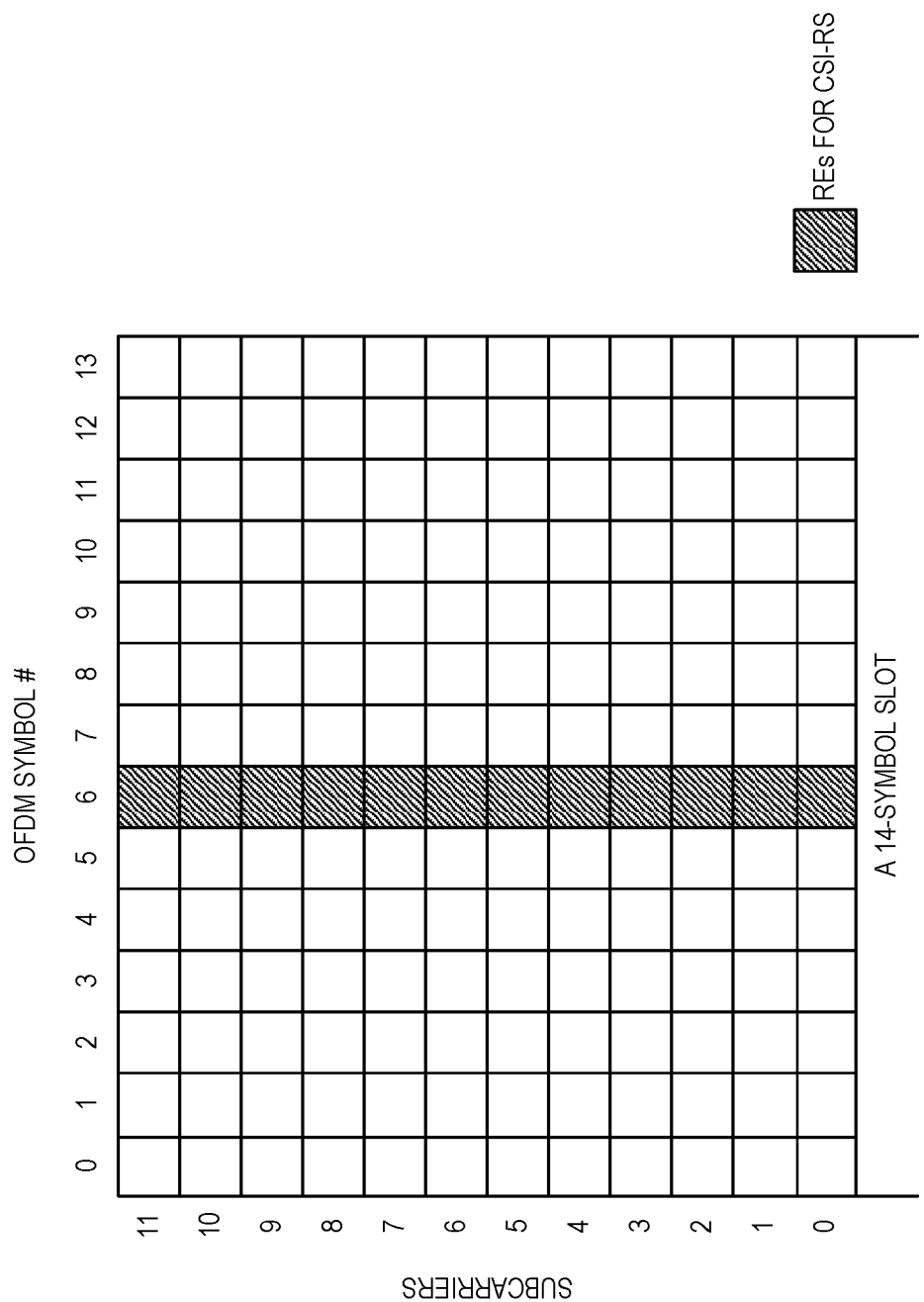
FIG. 3 illustrates an example of CSI-RS REs for 12 antenna ports, where one RE per RB per port is shown.
Figure 4:
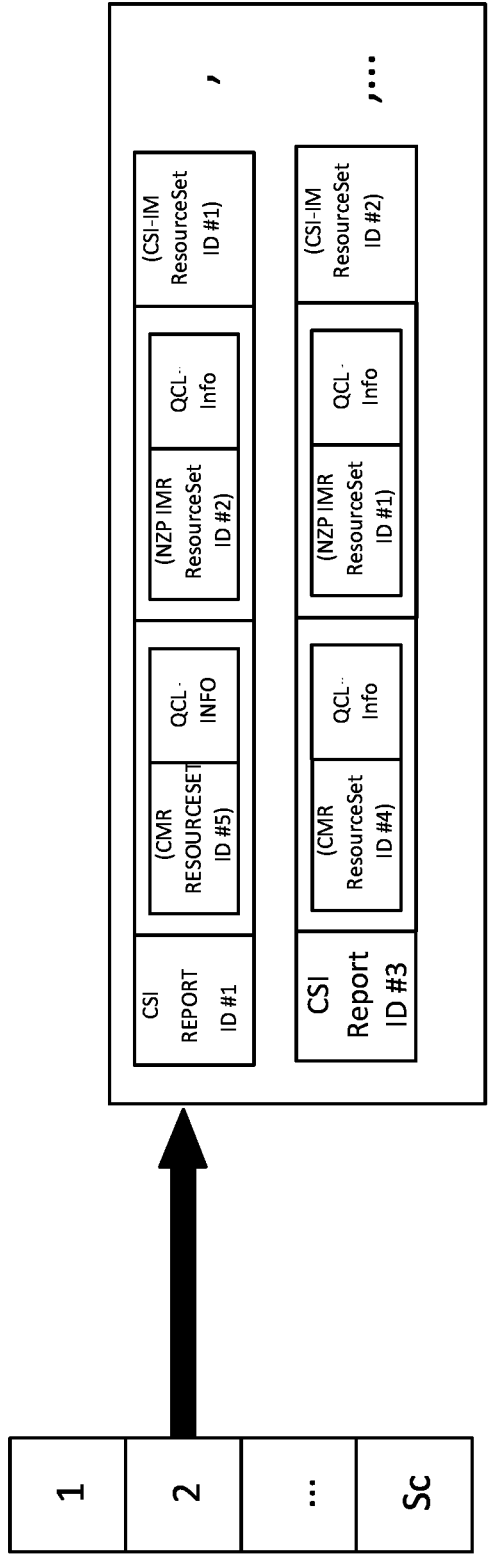
FIG. 4 illustrates an aperiodic trigger state definition.
Figure 5:
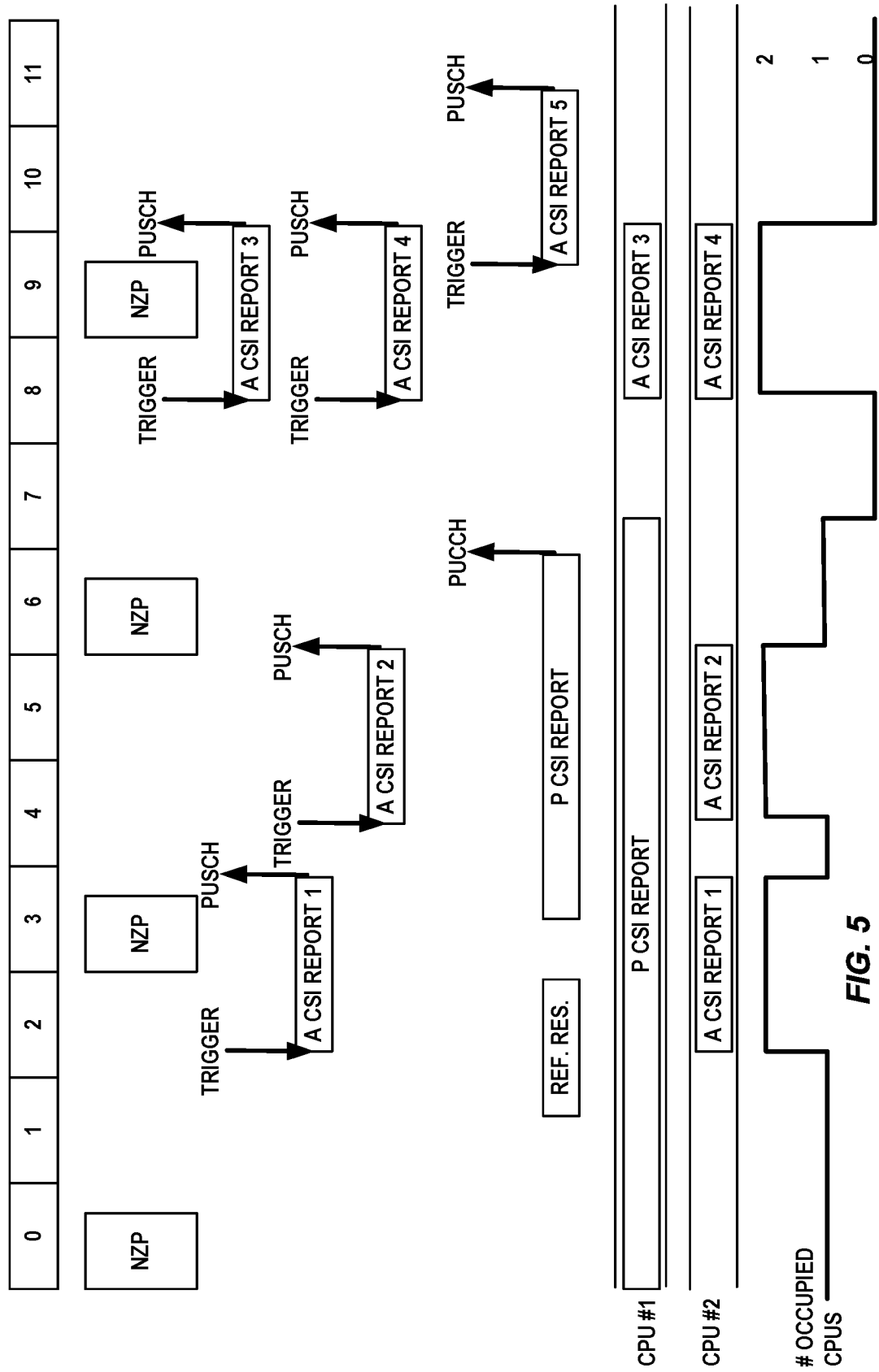
FIG. 5 illustrates a concept of CPU occupation where the UE is assumed to have two CPUs available.
Figure 6:
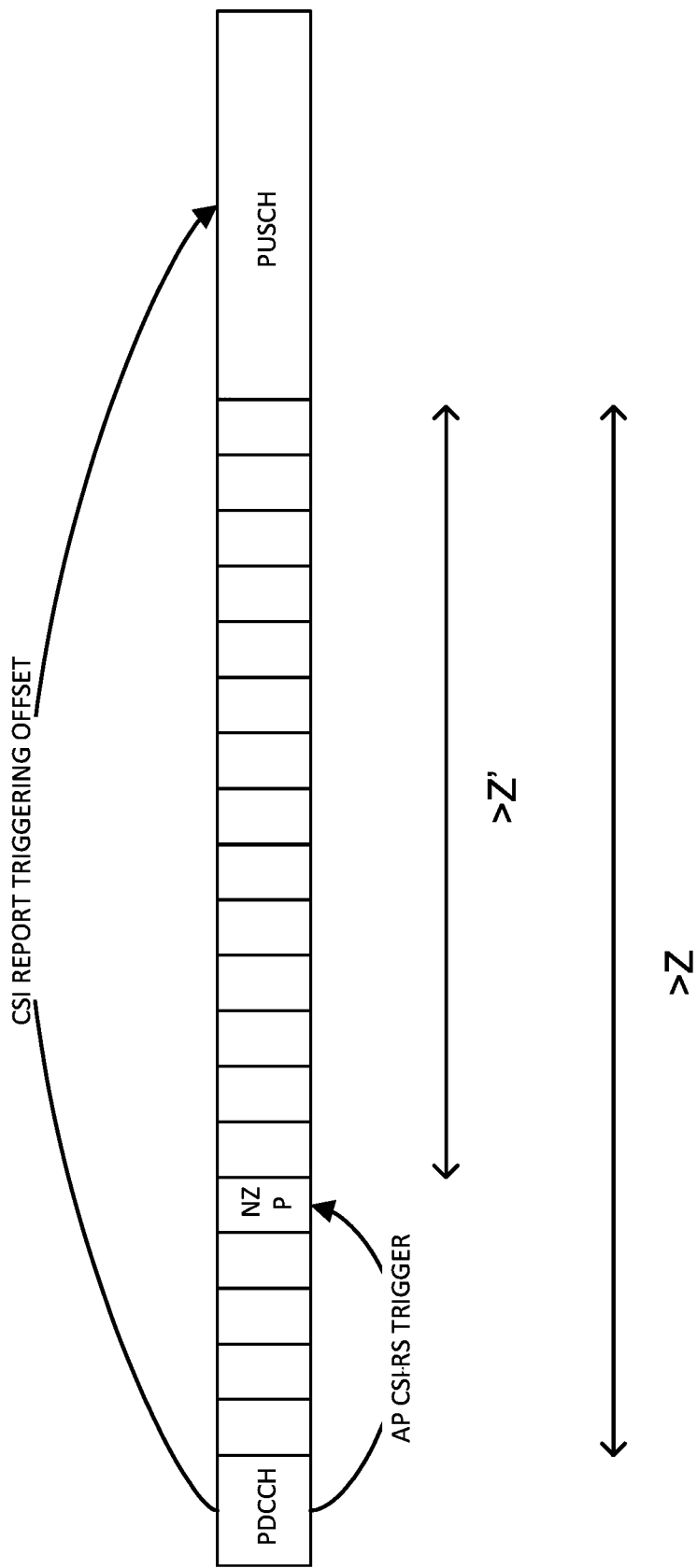
FIG. 6 illustrates effects of using a CSI report triggering offset.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 8:
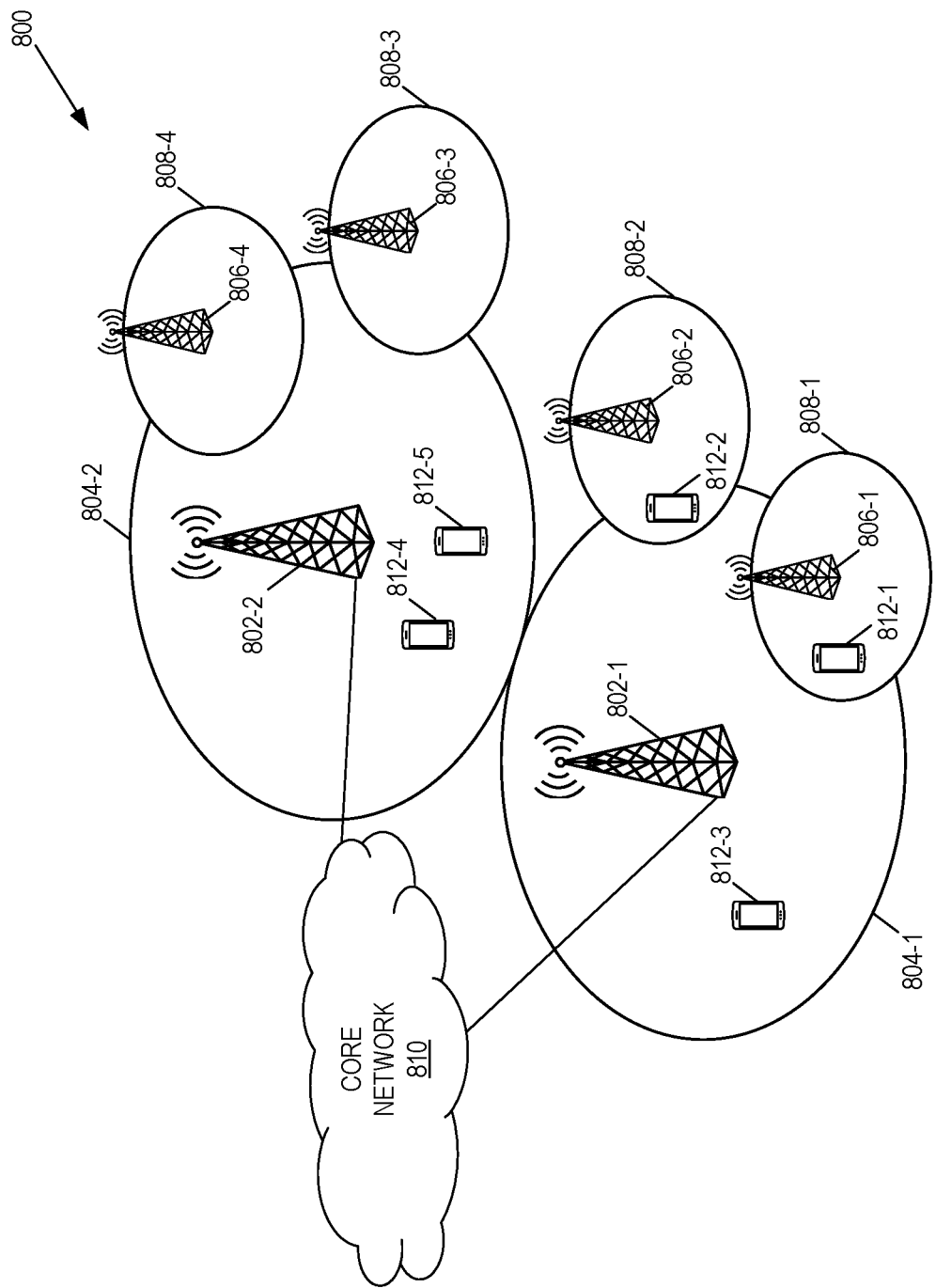
FIG. 8 illustrates one example of a cellular communications system in which embodiments of the present disclosure may be implemented.

FIG. 8 illustrates one example of a cellular communications system 800 in which embodiments of the present disclosure may be implemented. In the embodiments described herein, the cellular communications system 800 is a 5G system (5GS) including a NR Radio Access Network (RAN). In this example, the RAN includes base stations 802-1 and 802-2, which in 5G NR are referred to as gNBs (e.g., LTE RAN nodes connected to 5GC, which are referred to as gn-eNBs), controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The RAN may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The cellular communications system 800 also includes a core network 810, which in the 5GS is referred to as the 5G core (5GC). The base stations 802 (and optionally the low power nodes 806) are connected to the core network 810.

The base stations 802 and the low power nodes 806 provide service to wireless communication devices 812-1 through 812-5 in the corresponding cells 804 and 808. The wireless communication devices 812-1 through 812-5 are generally referred to herein collectively as wireless communication devices 812 and individually as wireless communication device 812. In the following description, the wireless communication devices 812 are oftentimes UEs, but the present disclosure is not limited thereto.

Figure 9:
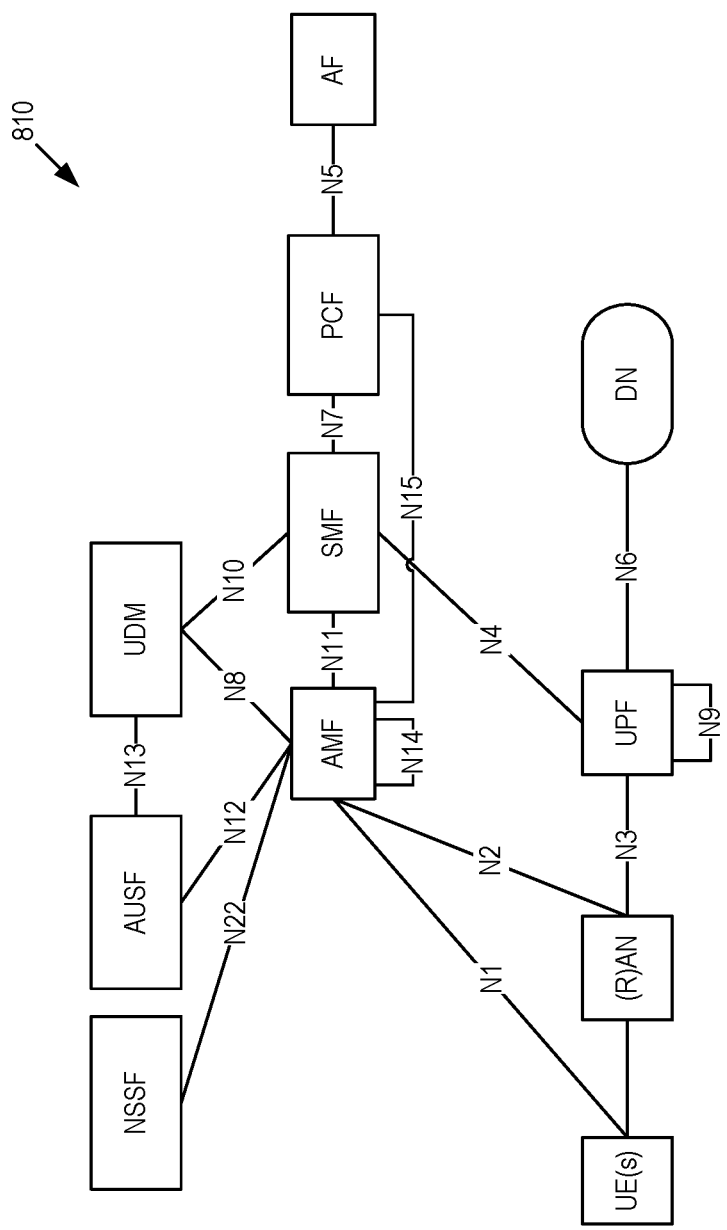
FIG. 9 illustrates a wireless communication system represented as a 5G network architecture composed of core Network Functions (NFs), where interaction between any two NFs is represented by a point-to-point reference point/interface.

FIG. 9 illustrates a wireless communication system represented as a 5G network architecture composed of core Network Functions (NFs), where interaction between any two NFs is represented by a point-to-point reference point/interface. FIG. 9 can be viewed as one particular implementation of the system 800 of FIG. 8.

Seen from the access side the 5G network architecture shown in FIG. 9 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 9 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 9, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 9. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 10:
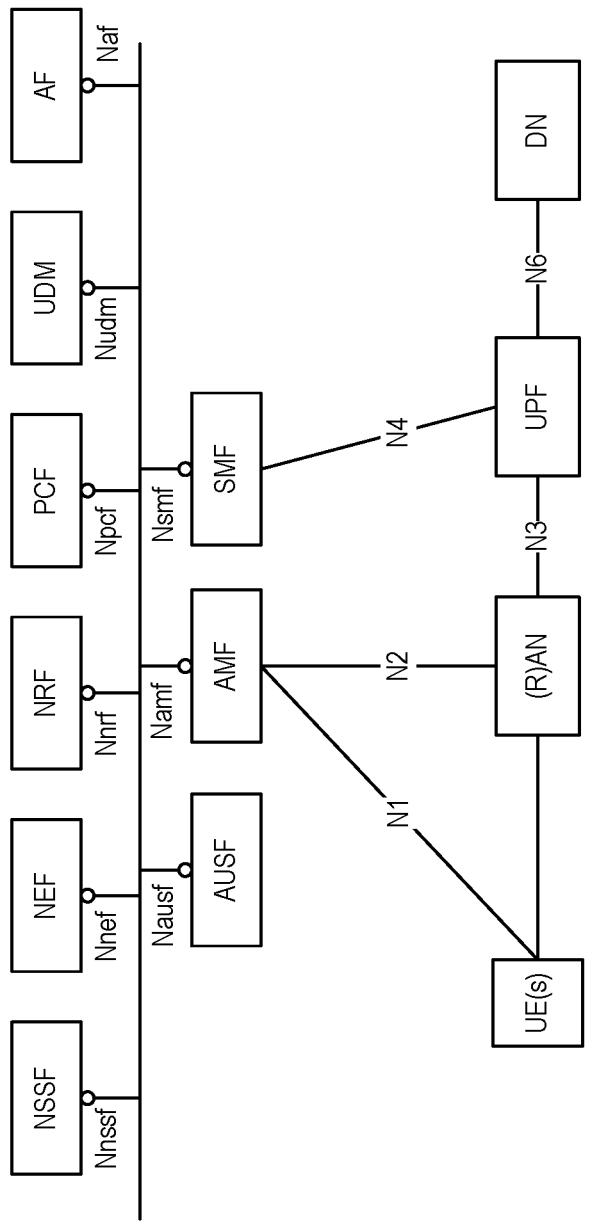
FIG. 10 illustrates a 5G network architecture using service-based interfaces between the NFs in the control plane, instead of the point-to-point reference points/interfaces used in the 5G network architecture of FIG. 9.

FIG. 10 illustrates a 5G network architecture using service-based interfaces between the NFs in the control plane, instead of the point-to-point reference points/interfaces used in the 5G network architecture of FIG. 9. However, the NFs described above with reference to FIG. 9 correspond to the NFs shown in FIG. 10. The service(s) etc. that a NF provides to other authorized NFs can be exposed to the authorized NFs through the service-based interface. In FIG. 10 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 10 are not shown in FIG. 9 discussed above. However, it should be clarified that all NFs depicted in FIG. 9 can interact with the NEF and the NRF of FIG. 10 as necessary, though not explicitly indicated in FIG. 9.

Some properties of the NFs shown in FIGS. 9 and 10 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

There currently exist certain challenge(s). The ultra-low latency CSI timing is, as described in the background sections, useful when the gNB needs to rapidly schedule URLLC data and thus acquire CSI quickly to use a correct link adaptation for the URLLC transmission. This reduces the risk for HARQ retransmissions which are critical to keep at minimum for low latency applications.

However, the ultra-low latency timing can only be applied when the UE is not already calculating any other CSI report, which is quite restrictive. It should be noted also that a given UE may use parallel services simultaneously, some mobile broadband services with "normal" latency requirements and additional service with URLLC requirements. The current framework is restrictive since the regular "High Latency" CSI reports require comparably long CSI processing times, e.g., an equivalent of six slots in 30 kHz SCS.

Figure 7:
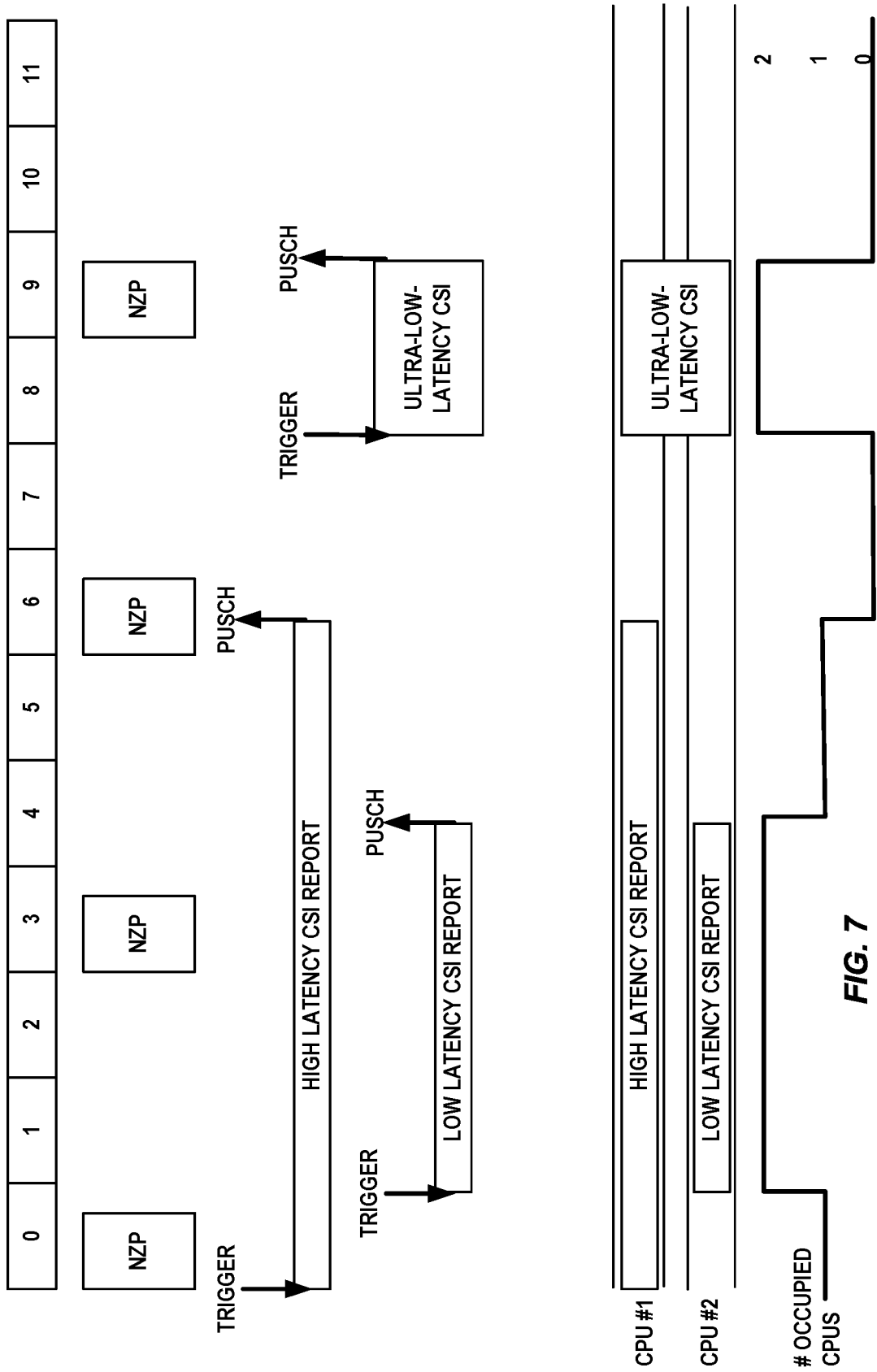
FIG. 7 illustrates the gNB triggering a regular High Latency CSI report, which requires a 6-slot offset so that one CPU is occupied until slot 6 when the corresponding PUSCH carrying the CSI report is transmitted by the UE.

Consider the example illustrated in FIG. 7 below. In slot #0, the gNB triggers a regular High Latency CSI report, which requires a 6-slot offset, so that one CPU is occupied until slot 6 when the corresponding PUSCH carrying the CSI report is transmitted by the UE. In slot #1 however, a URLLC packet arrives and the gNB wishes to obtain instant, ultra-low latency CSI, at slot 2 for example, in order to aid the link adaptation of the URLLC Physical Downlink Shared Channel (PDSCH). However, since one CPU is already occupied by the report triggered in slot #0, the regular Low Latency requirement and not the ultra-low latency requirement applies, which means that the gNB cannot schedule a CSI report within slot #2 (in this case the UE would report a stale or dummy CSI report). Instead, the gNB has to schedule the CSI report in slot #4. However, if a CSI report (fulfilling the requirements) would be triggered in slot #8, when no CPU is occupied, the ultra-low latency timing requirements would apply, which would be desired.

Note that all timelines are "active" at the same time for the UE, and which timeline applies depends on several factors as described above. These factors are CPU occupancy, number of CSI reports, whether PUSCH also carries HARQ-ACK and/or UL-SCH, frequency-granularity of CSI, number of CSI-RS resources and the number of CSI-RS ports.

It is a problem for URLLC CSI reporting for a UE which simultaneously has normal service (e.g., mobile broadband) and URLLC service since the CSI feedback critical for URLLC is many times down-prioritized based in the current rules.

Systems and methods for flexible triggering of CSI reports are provided. In some embodiments, a method performed by a wireless device for transmitting a CSI report according to a timeline requirement includes one or more of: determining to enable timeline switching; receiving, from a network node, an instruction to calculate a first CSI report; responsive to determining to enable timeline switching and receiving the instruction to calculate the first report, determining to stop calculating an existing ongoing second CSI report; calculating the first CSI report; and transmitting, to the network node, the first CSI report. In this way, some embodiments of the current disclosure allow ultra-low latency CSI reporting also for the cases when the wireless device is already in the ongoing process of calculating a CSI report, e.g., for mobile broadband service. In some embodiments, Ultra-Reliable Low-Latency Communication (URLLC) CSI reports are allowed to "override" previous CSI calculations and thus allocate all CSI computation resources for the URLLC CSI report to achieve and maintain a faster CSI timeline. Some embodiments achieve more flexible triggering of URLLC CSI reports so that the ultra-low latency CSI timeline can be applied for more cases, which reduces the CSI latency and in turn results in more reliable URLLC scheduling.

FIG. 11 illustrates an example embodiment. In some embodiments, a wireless device determines to enable timeline switching (step 1100). In some embodiments, the wireless device optionally determines (e.g., calculates or computes) the existing ongoing second CSI report for a certain duration in time (step 1102).

In some embodiments, a wireless device receives, from a network node, an instruction to determine a first CSI report (step 1104). Responsive to receiving the higher layer configuration to enable timeline switching, and also receiving the instruction to calculate the first report, in some embodiments, a wireless device determines to stop determining an existing ongoing second CSI report (step 1106). The wireless device optionally determines the first CSI report after it stops calculating the second CSI report (step 1108). The wireless device transmits, to the network node, the first CSI report (step 1110). In some embodiments, the wireless device suspended calculating the second CSI report and now resumes the second CSI report (step 1112).

FIG. 12 illustrates an example embodiment. In some embodiments, the base station determines to enable timeline switching (step 1200). In some embodiments, the base station transmits, to a wireless device, an instruction to determine (e.g., calculate or compute) a first CSI report (step 1202). In some embodiments, the base station receives (1204), from the wireless device, the first CSI report, where the wireless device stopped determining an existing ongoing second CSI report. In some embodiments, the base station receives, from the wireless device, the second CSI report (step 1206).

Some embodiments of the current disclosure may allow ultra-low latency CSI reporting also for the cases when the UE is already in the ongoing process of calculating a CSI report, e.g., for mobile broadband service. Some embodiments of the current disclosure may be applicable for the case when at least one CPU is already occupied and the UE receives an aperiodic CSI request for a certain CSI report category (which may in some embodiments be a single Low Latency CSI report, following the Rel-15 behavior).

When sending the aperiodic CSI request for the certain CSI report category, the gNB may in some cases want to receive the CSI report instantly due to that, for instance, a transmission of a URLLC PDSCH is imminent. In these cases, it may be appropriate to deprioritize (i.e., "sacrifice") the calculations of ongoing CSI reports so that the UE can focus all of its computational resources on calculating the triggered CSI report. However, in other cases, the gNB may just be interested in receiving another non-urgent CSI report, which would not warrant the sacrifice of ongoing CSI calculations. Therefore, it may be beneficial to able to dynamically indicate which timeline requirement should apply and to which CSI report category UE should allocate (or reallocate) its CSI computation resources.

One aspect of the disclosure comprises a method to configure the UE from the gNB with a procedure, e.g., by RRC signaling, that enables the UE to determine whether a first CSI timeline requirement (for instance the regular Low Latency requirement) should be applied for the aperiodic CSI request or whether a second CSI timeline requirement (for instance the ultra-Low latency requirement) should be applied for the triggered aperiodic CSI report.

In another aspect of the disclosure, the method additionally comprises configuring the UE from the gNB, e.g., by RRC signaling, that enables a procedure in the UE used for determining whether to abort or deprioritize the calculation(s) of currently ongoing CSI reports when receiving an aperiodic CSI request for the certain CSI report category.

Figure 13:
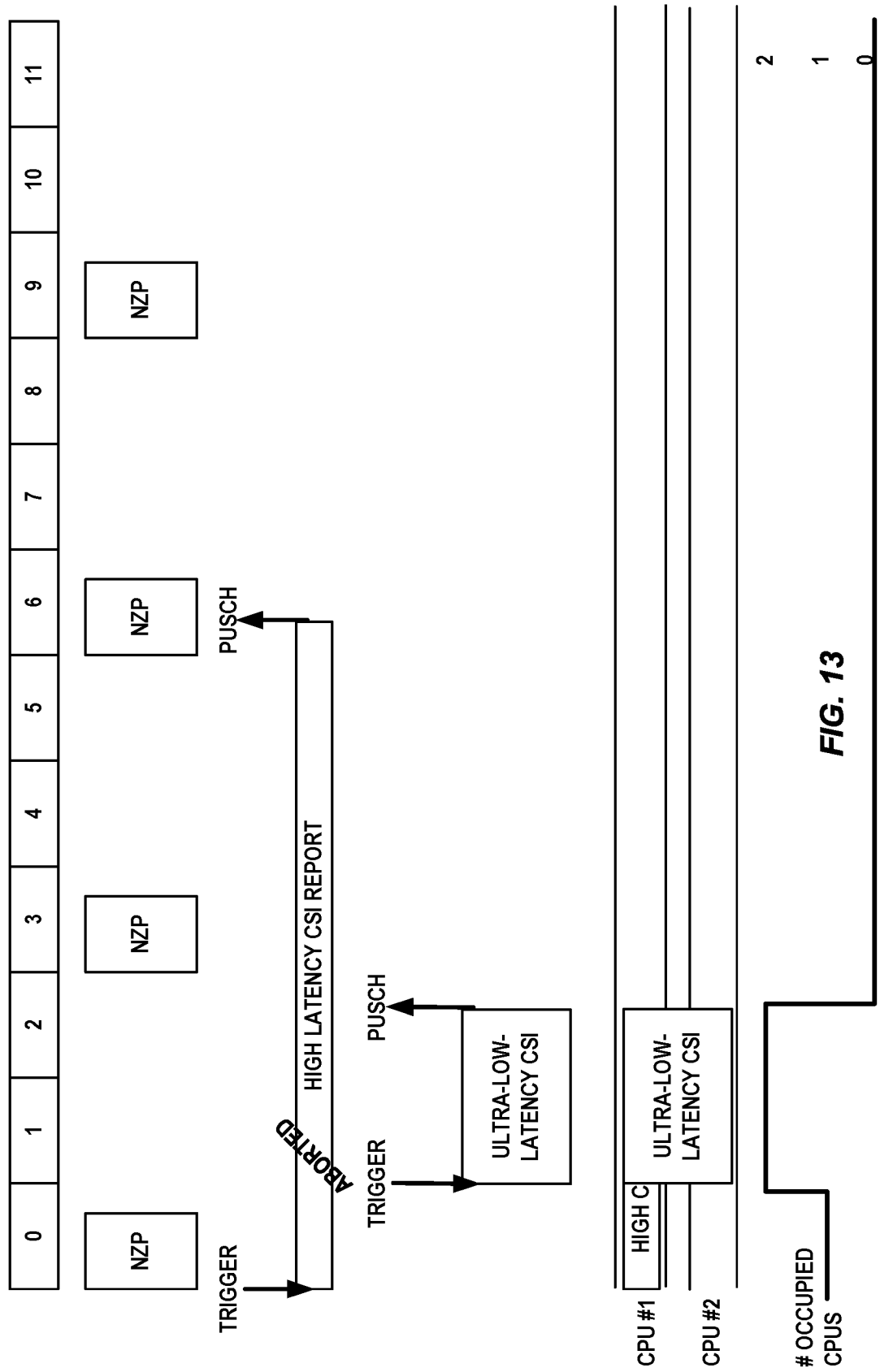
FIG. 13 illustrates that a wireless device has been configured by higher layer signaling to enable a procedure to enable timeline switching, according to some embodiments of the present disclosure.

An example embodiment of the disclosure is described, which is also illustrated in FIG. 13. The UE has been configured by higher layer signaling to enable a procedure to enable timeline switching according to the explanation below. In slot #0, the UE is triggered with a regular High Latency CSI report, scheduled with a slot offset of six slots until the PUSCH is transmitted. The CPU occupancy is then assumed to be for the full six slots and the UE proceeds with calculation of the High Latency CSI report. In slot #1 however, the UE is triggered with a Low Latency CSI report, which indicates whether the first or the second timeline requirement should be applied. When being triggered with the aperiodic CSI request for the certain CSI category, the UE determines which timeline condition should be applied by reading the RRC-configured flag. This means that the gNB can be configured with different aperiodic CSI trigger states mapping to different CSI Report Configs in order to be able to dynamically switch between the timeline requirements.

An alternative approach is to include the aforementioned flag instead in the definition of the CSI trigger state, which is done in an embodiment. This means that two different aperiodic trigger states can point to the same CSI Report Config but have different values set for the flag, e.g., ON or OFF. The gNB can then trigger different aperiodic triggering states to dynamically switch between the timeline requirements for the same report. For instance, this could be accomplished by adding the field applyFastTimeline in the RRC IE CSI-AssociatedReportConfigInfo according to below:

```
CSI-AperiodicTriggerStateList information element

-- ASN1START
-- TAG-CSI-APERIODICTRIGGERSTATELIST-START
CSI-AperiodicTriggerStateList ::=              SEQUENCE (SIZE
(1..maxNrOfCSI-AperiodicTriggers)) OF CSI-AperiodicTriggerState
CSI-AperiodicTriggerState ::=                  SEQUENCE {
    associatedReportConfigInfoList             SEQUENCE
(SIZE(1..maxNrofReportConfigPerAperiodicTrigger)) OF CSI-
AssociatedReportConfigInfo,
    ...
}
CSI-AssociatedReportConfigInfo ::=             SEQUENCE {
    reportConfigId                             CSI-ReportConfigId,
    resourcesForChannel                        CHOICE {
        nzp-CSI-RS                             SEQUENCE {
            resourceSet                        INTEGER
(1..maxNrofNZP-CSI-RS-ResourceSetsPerConfig),
            qcl-info                           SEQUENCE
(SIZE(1..maxNrofAP-CSI-RS-ResourcesPerSet)) OF TCI-StateId
OPTIONAL -- Cond Aperiodic
        },
        csi-SSB-ResourceSet                    INTEGER
(1..maxNrofCSI-SSB-ResourceSetsPerConfig)
    },
    csi-IM-ResourcesForInterference            INTEGER(1..maxNrofCSI-IM-
ResourceSetsPerConfig)
OPTIONAL, -- Cond CSI-IM-ForInterference
    nzp-CSI-RS-ResourcesForInterference        INTEGER (1..maxNrofNZP-
CSI-RS-ResourceSetsPerConfig)
OPTIONAL, -- Cond NZP-CSI-RS-ForInterference
    applyFastTimeline   BOOLEAN                            OPTIONAL
    ...
}
-- TAG-CSI-APERIODICTRIGGERSTATELIST-STOP
-- ASN1STOP
``` and based on some determination step, the UE determines that the ultra-low Latency timeline should be applied instead of the regular timeline.

Based on this determination, the UE aborts or deprioritizes the calculation of the already ongoing High Latency CSI report and allocates all of its CSI computation resources to calculate the Low Latency CSI report (which then becomes an ultra-Low Latency CSI report). This implies that all of the CPUs become occupied for calculating the ultra-Low latency CSI report, and thus, the CPU occupancy for the High Latency report is "canceled".

There are several embodiments regarding how to determine which timeline/CSI priority should be applied. In one embodiment, the CSI Report Config in RRC includes a flag In yet another embodiment, which CSI timeline applies is indicated explicitly by a field in the triggering DCI, which then may be a 1-bit field.

An alternative way of formulating the above embodiment is to include a "CPU flush flag", whereby the UE upon reception of a DCI indicating a '1' for this flag, flushes the CPU occupancy of currently calculated CSI reports and subsequently occupies CPUs for the currently triggered CSI report(s). This approach may require less spec impact compared to explicitly indicating the timeline but has the same effect (i.e., the timeline and CPU occupancy is implicitly indicated by the CPU flush flag).

In yet another embodiment, the CSI timeline which applies is determines implicitly by the PUSCH slot offset $K_2$ indicated by the DCI comprising the aperiodic CSI trigger. For instance, if the indicated slot offset is below a threshold y the second timeline requirement is applied, otherwise, the first timeline requirement is applied.

In another embodiment, a CSI request for a second CSI report is received at a UE to report the second CSI in UL slot n2 while one or more CPU is still occupied by a first CSI to be reported in UL slot n1. If n2<n1 and the second CSI report fulfils the requirements (such as number of antenna ports, codebook used, frequency granularity, CQI table used, etc.) for an ultra-low latency CSI report, then the second timeline requirement applies. Alternatively, the second timeline requirement applies regardless whether n2<n1 or n2>n1 if the second CSI report fulfils the requirements for an ultra-low latency CSI report.

Some embodiments relate to what to do upon determining the timeline. In a preferred embodiment, when determining that it has been triggered with a CSI report utilizing the second CSI timeline requirement, and the CSI report timeline meets the minimum latency requirements if any ongoing CSI reports are aborted, the UE aborts or deprioritizes calculation of already ongoing CSI report, implying that the UE is allowed to report stale CSI or alternatively drop the CSI for those reports. In this case, the CPUs currently occupied by other CSI reports become de-occupied and can thus be occupied by calculation of the triggered CSI report.

If the CSI report in a UL slot does not collide with any ongoing CSI reports in the slot, the ongoing CSI reports are transmitted with stale CSI if the reports are multiplexed with a Transport Block (TB) and/or HARQ Acknowledgement/Negative Acknowledgement (A/N). If the ongoing CSI reports are not multiplexed with a TB or HARQ A/N, the ongoing CSI reports are dropped.

Since the ultra-low Latency CSI requirement only applies when a single Low Latency report is triggered without UL-SCH and/or HARQ-ACK, it may be beneficial to be able to postpone HARQ-ACK transmission in case HARQ-ACK is scheduled to be transmitted in a slot where the gNB would desire to trigger ultra-low Latency CSI. Therefore, in an embodiment, the UE responsive to determining that the second CSI timeline is applied and that HARQ-ACK is scheduled to be transmitted on the scheduled PUSCH delays or postpones the HARQ-ACK transmission to a subsequent time occasion (such as the next slot), so that the ultra-low Latency CSI timeline requirement can be applied.

If the CSI report in a UL slot collides with a previously scheduled TB in the slot, then the TB is dropped. Alternatively, the CSI report is delayed to the next available UL slot.

Figure 14:
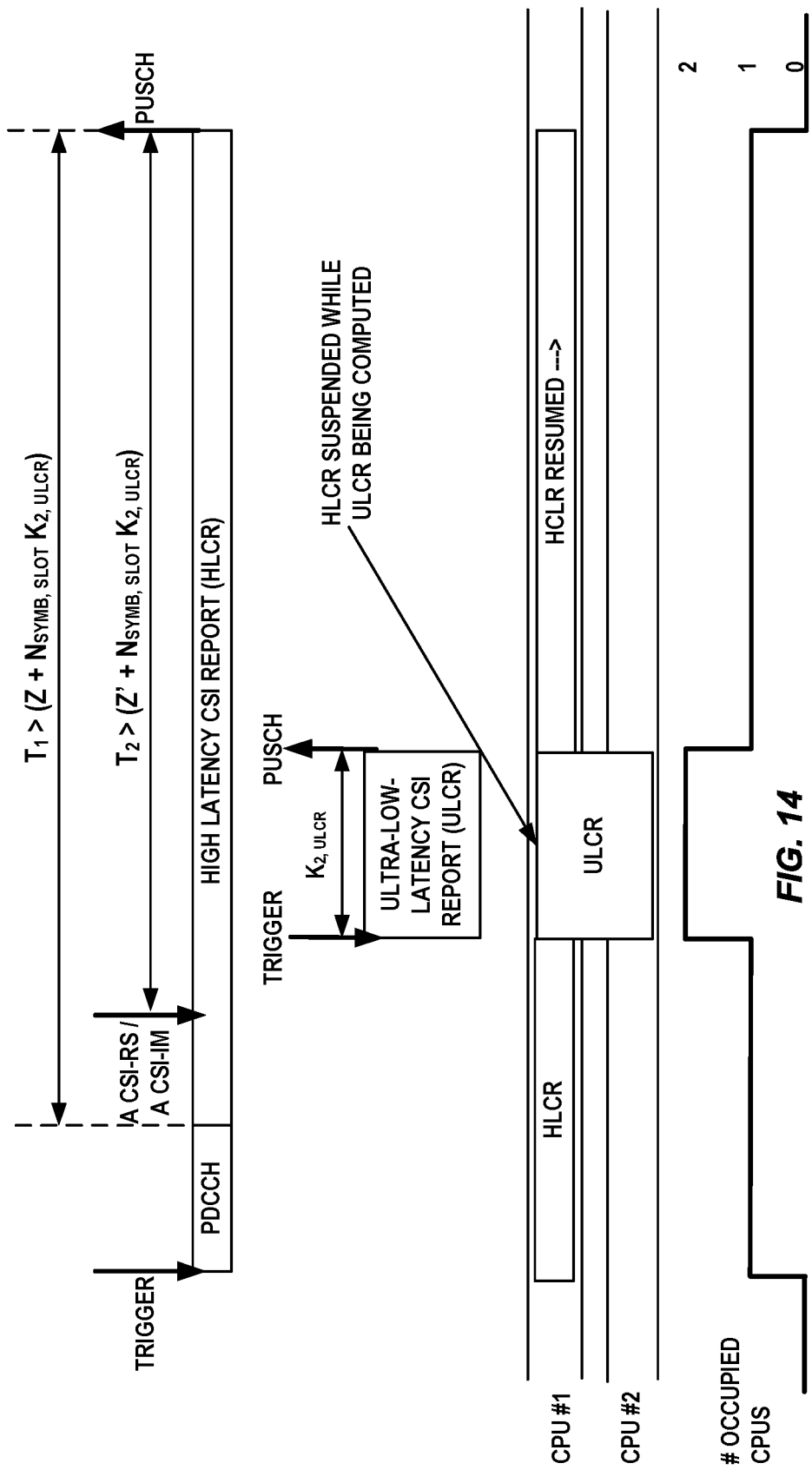
FIG. 14 illustrates that the wireless device suspends calculation of an already ongoing high latency CSI report when a trigger for an ultra-low latency CSI report arrives, according to some embodiments of the present disclosure.

Alternate Embodiment on CSI suspension and resume: In an alternate embodiment, the UE suspends calculation of an already ongoing high latency CSI report when a trigger for an ultra-low latency CSI report arrives as shown in FIG. 14. Let $K_{2,ULCR}$ denote the PUSCH slot offset indicated by the DCI that triggers the ultra-low latency CSI report. When the ultra-low latency CSI report is triggered by the DCI, a 'CSI suspension flag' is indicated in this DCI. When the 'CSI suspension flag' is indicated, the high latency CSI report calculation is suspended from CPU #1 (i.e., likely stored in memory), and both CPUs #1 and #2 are allocated to the calculation of the ultra-low latency CSI report. However, upon completion of the ultra-low latency CSI report, whether to resume the high latency CSI report or not depends on a modified CSI timeline requirement that is dependent on (Z, Z') and $K_{2,ULCR}$. As shown in in FIG. 14, modified timeline requirements can include one or more:

Requirement 1: a minimum number of OFDM symbols of $Z+N_{symb,slot}K_{2,ULCR}$ between the last symbol of the PDCCH triggering the aperiodic CSI report (e.g., the high latency CSI report in FIG. 14) and the first symbol of the PUSCH which carries the CSI report should be met where $N_{symb,slot}$ is the number of symbols per slot.

Requirement 2: a minimum number of OFDM symbols of $Z'+N_{symb,slot}K_{2,ULCR}$ between the last symbol of the aperiodic CSI-RS/IM used to calculate the report and the first symbol of the PUSCH which carries the CSI report is met where $N_{symb,slot}$ is the number of symbols per slot.

In both requirements, the added term $N_{symb,slot}K_{2,ULCR}$ compensates for the time lost while computing the ultra-low latency CSI report (i.e., the time lost while the high latency CSI report was suspended). If the modified timeline requirements are met, then the high latency CSI report computation is resumed on CPU #1 following reporting of the ultra-low latency CSI. If the modified timeline requirements are not met, then the suspended high latency CSI is not resumed on CPU #1 which means that the UE is allowed to report stale CSI for the high latency CSI report.

Latency CSI report. After the ultra-low latency CSI report is done, CSI calculation(s) of suspended CSI is resumed.

Note that suspension and resumption of a high latency CSI report is only possible if:
1. the trigger for the ultra-low latency CSI report is later than the trigger for the high latency CSI report, and
2. the PUSCH for the ultra-low latency CSI report is earlier than the PUSCH for the high latency CSI report.

Figure 15:
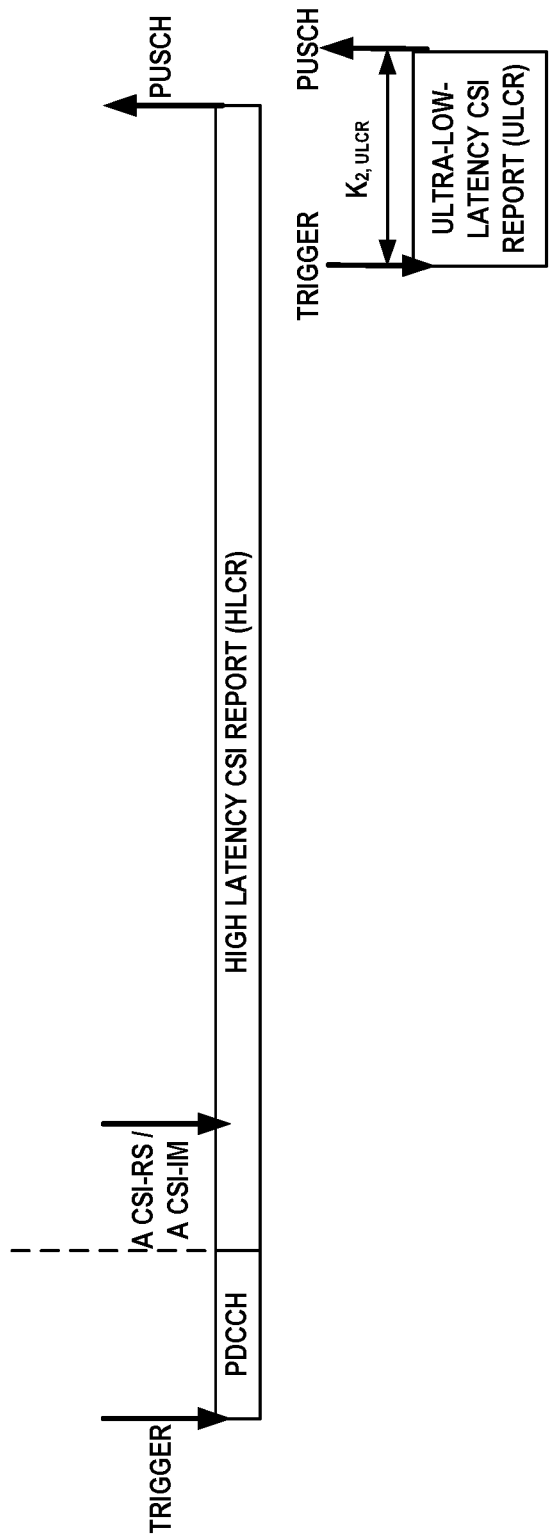
FIG. 15 illustrates an embodiment which allows sufficient time for resuming the computation of the high latency CSI report, according to some embodiments of the present disclosure.

This allows sufficient time for resuming the computation of the high latency CSI report (this is the case in the example illustrated in FIG. 15). However, if the PUSCH for the high latency CSI is in between the trigger and the PUSCH for the ultra-low latency CSI report, then there is no time to suspend/resume the high latency CSI computation. Such an example is shown in FIG. 10. In this case, the high latency CSI report is dropped.

Figure 16:
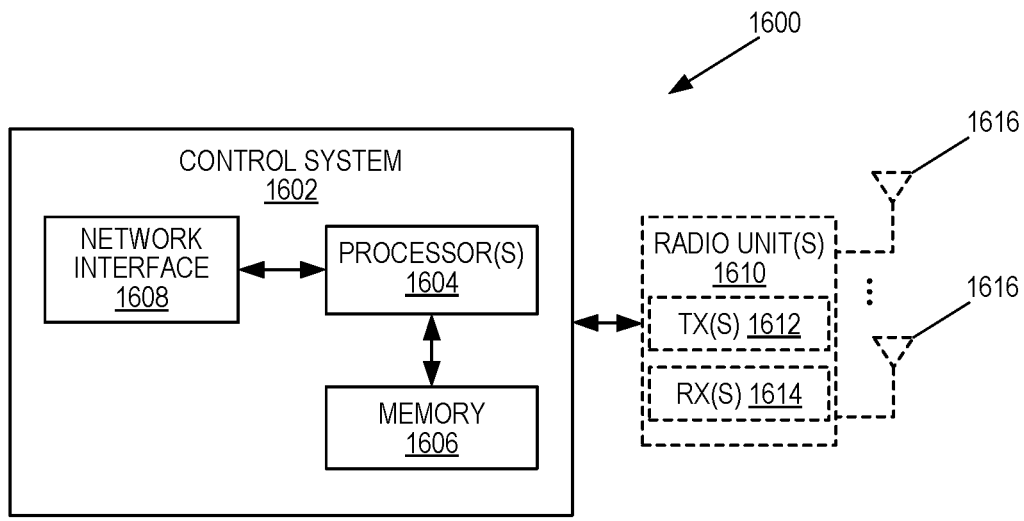
FIG. 16 is a schematic block diagram of a network node according to some embodiments of the present disclosure.

FIG. 16 is a schematic block diagram of a radio access node 1600 according to some embodiments of the present disclosure. Optional features are represented by dashed boxes. The radio access node 1600 may be, for example, a base station 802 or 806 or a network node that implements all or part of the functionality of the base station 802 or gNB described herein. As illustrated, the radio access node 1600 includes a control system 1602 that includes one or more processors 1604 (e.g., Central Processing Units, Application Specific Integrated Circuits (ASICs), Field Programmable Gate Arrays (FPGAs), and/or the like), memory 1606, and a network interface 1608. The one or more processors 1604 are also referred to herein as processing circuitry. In addition, the radio access node 1600 may include one or more radio units 1610 that each includes one or more transmitters 1612 and one or more receivers 1614 coupled to one or more antennas 1616. The radio units 1610 may be referred to or be part of radio interface circuitry. In some embodiments, the radio unit(s) 1610 is external to the control system 1602 and connected to the control system 1602 via, e.g., a wired connection (e.g., an optical cable). However, in some other embodiments, the radio unit(s) 1610 and potentially the antenna(s) 1616 are integrated together with the control system 1602. The one or more processors 1604 operate to provide one or more functions of a radio access node 1600 as described herein. In some embodiments, the function(s) are implemented in software that is stored, e.g., in the memory 1606 and executed by the one or more processors 1604.

Figure 17:
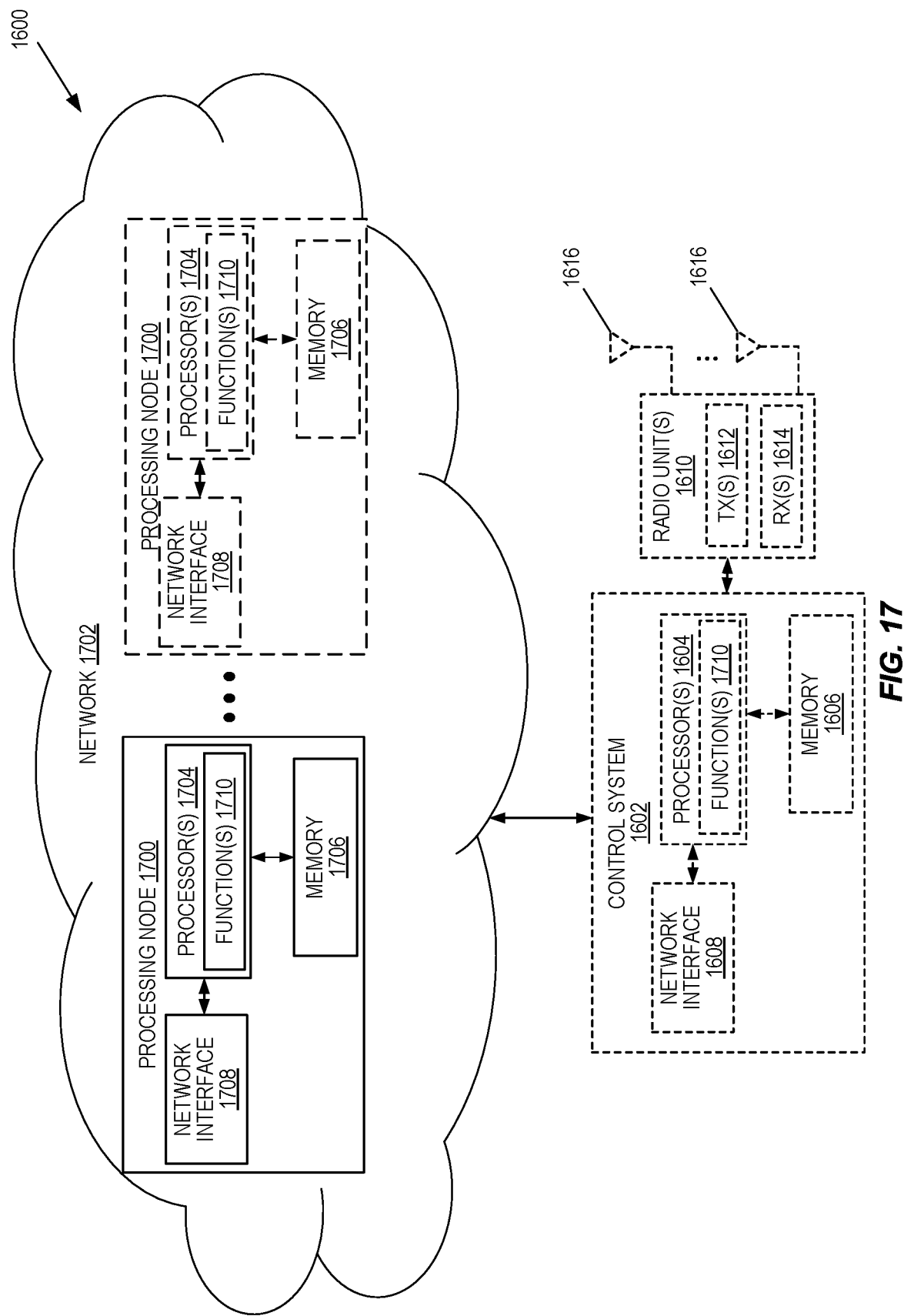
FIG. 17 is a schematic block diagram that illustrates a virtualized embodiment of the radio access node, according to some embodiments of the present disclosure.

FIG. 17 is a schematic block diagram that illustrates a virtualized embodiment of the radio access node 1600 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1600 in which at least a portion of the functionality of the radio access node 1600 is implemented as a virtual component(s) (e.g., via a virtual machine(s) executing on a physical processing node(s) in a network(s)). As illustrated, in this example, the radio access node 1600 may include the control system 1602 and/or the one or more radio units 1610, as described above. The control system 1602 may be connected to the radio unit(s) 1610 via, for example, an optical cable or the like. The radio access node 1600 includes one or more processing nodes 1700 coupled to or included as part of a network(s) 1702. If present, the control system 1602 or the radio unit(s) are connected to the processing node(s) 1700 via the network 1702. Each processing node 1700 includes one or more processors 1704 (e.g., Central Processing Units, ASICs, FPGAs, and/or the like), memory 1706, and a network interface 1708.

In this example, functions 1710 of the radio access node 1600 described herein are implemented at the one or more processing nodes 1700 or distributed across the one or more processing nodes 1700 and the control system 1602 and/or the radio unit(s) 1610 in any desired manner. In some particular embodiments, some or all of the functions 1710 of the radio access node 1600 described herein are implemented as virtual components executed by one or more virtual machines implemented in a virtual environment(s) hosted by the processing node(s) 1700. As will be appreciated by one of ordinary skill in the art, additional signaling or communication between the processing node(s) 1700 and the control system 1602 is used in order to carry out at least some of the desired functions 1710. Notably, in some embodiments, the control system 1602 may not be included, in which case the radio unit(s) 1610 communicate directly with the processing node(s) 1700 via an appropriate network interface(s).

In some embodiments, a computer program including instructions which, when executed by at least one processor, causes the at least one processor to carry out the functionality of radio access node 1600 or a node (e.g., a processing node 1700) implementing one or more of the functions 1710 of the radio access node 1600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
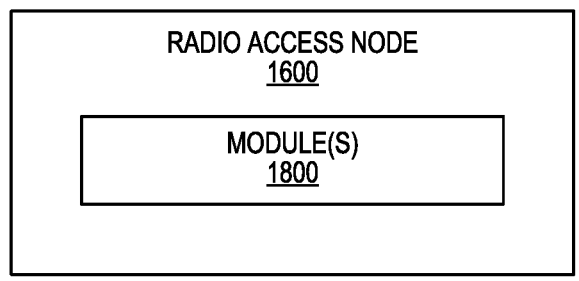
FIG. 18 is a schematic block diagram of the network node, according to some other embodiments of the present disclosure.

FIG. 18 is a schematic block diagram of the radio access node 1600 according to some other embodiments of the present disclosure. The radio access node 1600 includes one or more modules 1800, each of which is implemented in software. The module(s) 1800 provide the functionality of the radio access node 1600 described herein. This discussion is equally applicable to the processing node 1700 of FIG. 17 where the modules 1800 may be implemented at one of the processing nodes 1700 or distributed across multiple processing nodes 1700 and/or distributed across the processing node(s) 1700 and the control system 1602.

Figure 19:
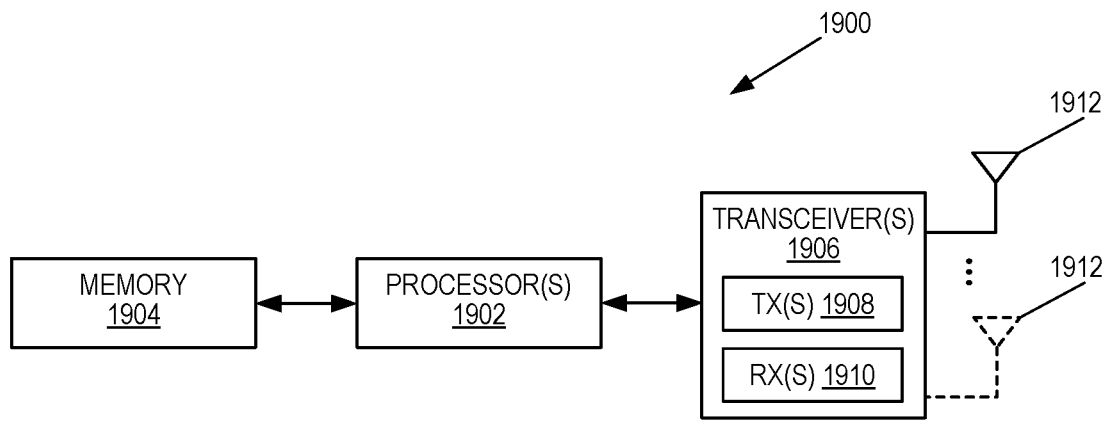
FIG. 19 is a schematic block diagram of a UE, according to some embodiments of the present disclosure.

FIG. 19 is a schematic block diagram of a wireless communication device 1900 according to some embodiments of the present disclosure. As illustrated, the wireless communication device 1900 includes one or more processors 1902 (e.g., Central Processing Units, ASICs, FPGAs, and/or the like), memory 1904, and one or more transceivers 1906 each including one or more transmitters 1908 and one or more receivers 1910 coupled to one or more antennas 1912. The transceiver(s) 1906 includes radio-front end circuitry connected to the antenna(s) 1912 that is configured to condition signals communicated between the antenna(s) 1912 and the processor(s) 1902, as will be appreciated by on of ordinary skill in the art. The processors 1902 are also referred to herein as processing circuitry. The transceivers 1906 are also referred to herein as radio circuitry. In some embodiments, the functionality of the wireless communication device 1900 described above may be fully or partially implemented in software that is, e.g., stored in the memory 1904 and executed by the processor(s) 1902. Note that the wireless communication device 1900 may include additional components not illustrated in FIG. 19 such as, e.g., one or more user interface components (e.g., an input/output interface including a display, buttons, a touch screen, a microphone, a speaker(s), and/or the like and/or any other components for allowing input of information into the wireless communication device 1900 and/or allowing output of information from the wireless communication device 1900), a power supply (e.g., a battery and associated power circuitry), etc.

In some embodiments, a computer program including instructions which, when executed by at least one processor, causes the at least one processor to carry out the functionality of the wireless communication device 1900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
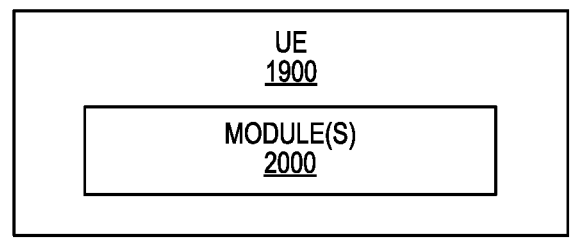
FIG. 20 is a schematic block diagram of the UE, according to some embodiments of the present disclosure.

FIG. 20 is a schematic block diagram of the wireless communication device 1900 according to some other embodiments of the present disclosure. The wireless communication device 1900 includes one or more modules 2000, each of which is implemented in software. The module(s) 2000 provide the functionality of the wireless communication device 1900 described herein.

Figure 21:
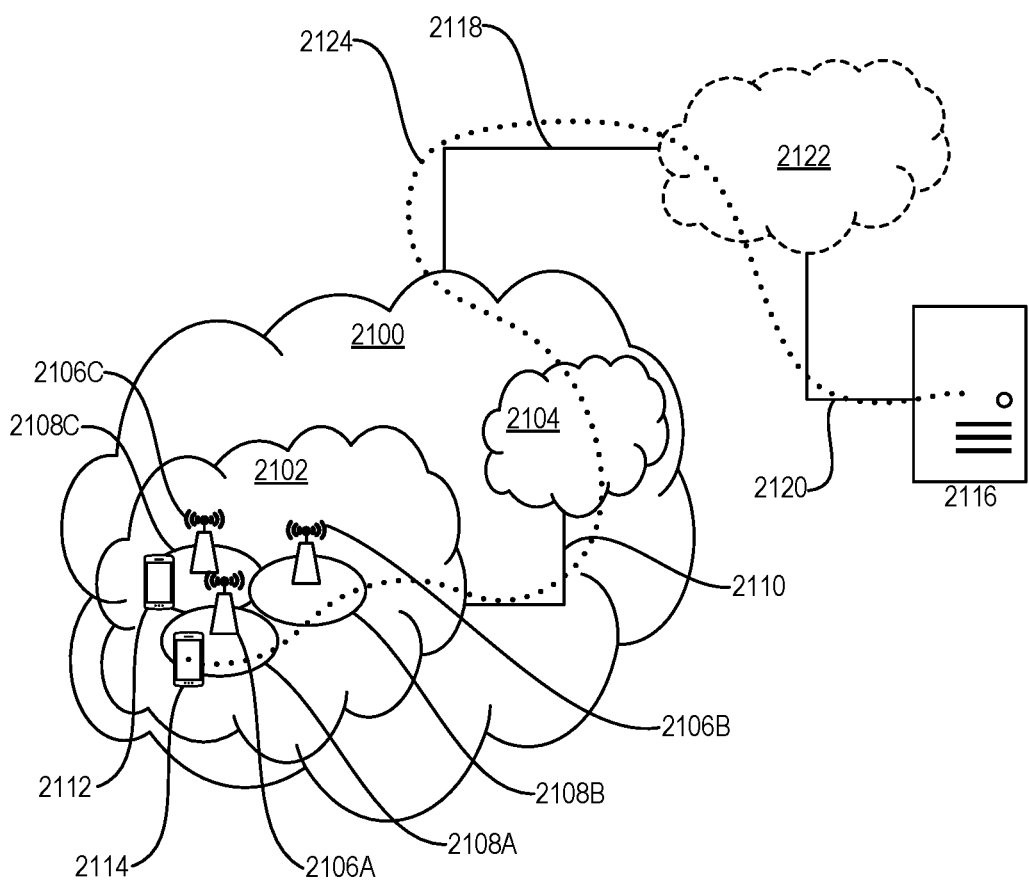
FIGS. 21 and 22 illustrate examples of a cellular communications system, according to some embodiments of the present disclosure.

With reference to FIG. 21, in accordance with an embodiment, a communication system includes a telecommunication network 2100, such as a 3GPP-type cellular network, which comprises an access network 2102, such as a RAN, and a core network 2104. The access network 2102 comprises a plurality of base stations 2106A, 2106B, 2106C, such as Node Bs, eNBs, gNBs, or other types of wireless Access Points (APs), each defining a corresponding coverage area 2108A, 2108B, 2108C. Each base station 2106A, 2106B, 2106C is connectable to the core network 2104 over a wired or wireless connection 2110. A first UE 2112 located in coverage area 2108C is configured to wirelessly connect to, or be paged by, the corresponding base station 2106C. A second UE 2114 in coverage area 2108A is wirelessly connectable to the corresponding base station 2106A. While a plurality of UEs 2112, 2114 are illustrated in this example, the disclosed embodiments are equally applicable to a situation where a sole UE is in the coverage area or where a sole UE is connecting to the corresponding base station 2106.

The telecommunication network 2100 is itself connected to a host computer 2116, which may be embodied in the hardware and/or software of a standalone server, a cloud-implemented server, a distributed server, or as processing resources in a server farm. The host computer 2116 may be under the ownership or control of a service provider or may be operated by the service provider or on behalf of the service provider. Connections 2118 and 2120 between the telecommunication network 2100 and the host computer 2116 may extend directly from the core network 2104 to the host computer 2116 or may go via an optional intermediate network 2122. The intermediate network 2122 may be one of, or a combination of more than one of, a public, private, or hosted network; the intermediate network 2122, if any, may be a backbone network or the Internet; in particular, the intermediate network 2122 may comprise two or more sub-networks (not shown).

The communication system of FIG. 21 as a whole enables connectivity between the connected UEs 2112, 2114 and the host computer 2116. The connectivity may be described as an Over-the-Top (OTT) connection 2124. The host computer 2116 and the connected UEs 2112, 2114 are configured to communicate data and/or signaling via the OTT connection 2124, using the access network 2102, the core network 2104, any intermediate network 2122, and possible further infrastructure (not shown) as intermediaries. The OTT connection 2124 may be transparent in the sense that the participating communication devices through which the OTT connection 2124 passes are unaware of routing of uplink and downlink communications. For example, the base station 2106 may not or need not be informed about the past routing of an incoming downlink communication with data originating from the host computer 2116 to be forwarded (e.g., handed over) to a connected UE 2112. Similarly, the base station 2106 need not be aware of the future routing of an outgoing uplink communication originating from the UE 2112 towards the host computer 2116.

Example implementations, in accordance with an embodiment, of the UE, base station, and host computer discussed in the preceding paragraphs will now be described with reference to FIG. 22. In a communication system 2200, a host computer 2202 comprises hardware 2204 including a communication interface 2206 configured to set up and maintain a wired or wireless connection with an interface of a different communication device of the communication system 2200. The host computer 2202 further comprises processing circuitry 2208, which may have storage and/or processing capabilities. In particular, the processing circuitry 2208 may comprise one or more programmable processors, ASICs, FPGAs, or combinations of these (not shown) adapted to execute instructions. The host computer 2202 further comprises software 2210, which is stored in or accessible by the host computer 2202 and executable by the processing circuitry 2208. The software 2210 includes a host application 2212. The host application 2212 may be operable to provide a service to a remote user, such as a UE 2214 connecting via an OTT connection 2216 terminating at the UE 2214 and the host computer 2202. In providing the service to the remote user, the host application 2212 may provide user data which is transmitted using the OTT connection 2216.

The communication system 2200 further includes a base station 2218 provided in a telecommunication system and comprising hardware 2220 enabling it to communicate with the host computer 2202 and with the UE 2214. The hardware 2220 may include a communication interface 2222 for setting up and maintaining a wired or wireless connection with an interface of a different communication device of the communication system 2200, as well as a radio interface 2224 for setting up and maintaining at least a wireless connection 2226 with the UE 2214 located in a coverage area (not shown in FIG. 22) served by the base station 2218. The communication interface 2222 may be configured to facilitate a connection 2228 to the host computer 2202. The connection 2228 may be direct or it may pass through a core network (not shown in FIG. 22) of the telecommunication system and/or through one or more intermediate networks outside the telecommunication system. In the embodiment shown, the hardware 2220 of the base station 2218 further includes processing circuitry 2230, which may comprise one or more programmable processors, ASICs, FPGAs, or combinations of these (not shown) adapted to execute instructions. The base station 2218 further has software 2232 stored internally or accessible via an external connection.

The communication system 2200 further includes the UE 2214 already referred to. The UE's 2214 hardware 2234 may include a radio interface 2236 configured to set up and maintain a wireless connection 2226 with a base station serving a coverage area in which the UE 2214 is currently located. The hardware 2234 of the UE 2214 further includes processing circuitry 2238, which may comprise one or more programmable processors, ASICs, FPGAs, or combinations of these (not shown) adapted to execute instructions. The UE 2214 further comprises software 2240, which is stored in or accessible by the UE 2214 and executable by the processing circuitry 2238. The software 2240 includes a client application 2242. The client application 2242 may be operable to provide a service to a human or non-human user via the UE 2214, with the support of the host computer 2202. In the host computer 2202, the executing host application 2212 may communicate with the executing client application 2242 via the OTT connection 2216 terminating at the UE 2214 and the host computer 2202. In providing the service to the user, the client application 2242 may receive request data from the host application 2212 and provide user data in response to the request data. The OTT connection 2216 may transfer both the request data and the user data. The client application 2242 may interact with the user to generate the user data that it provides.

Figure 22:
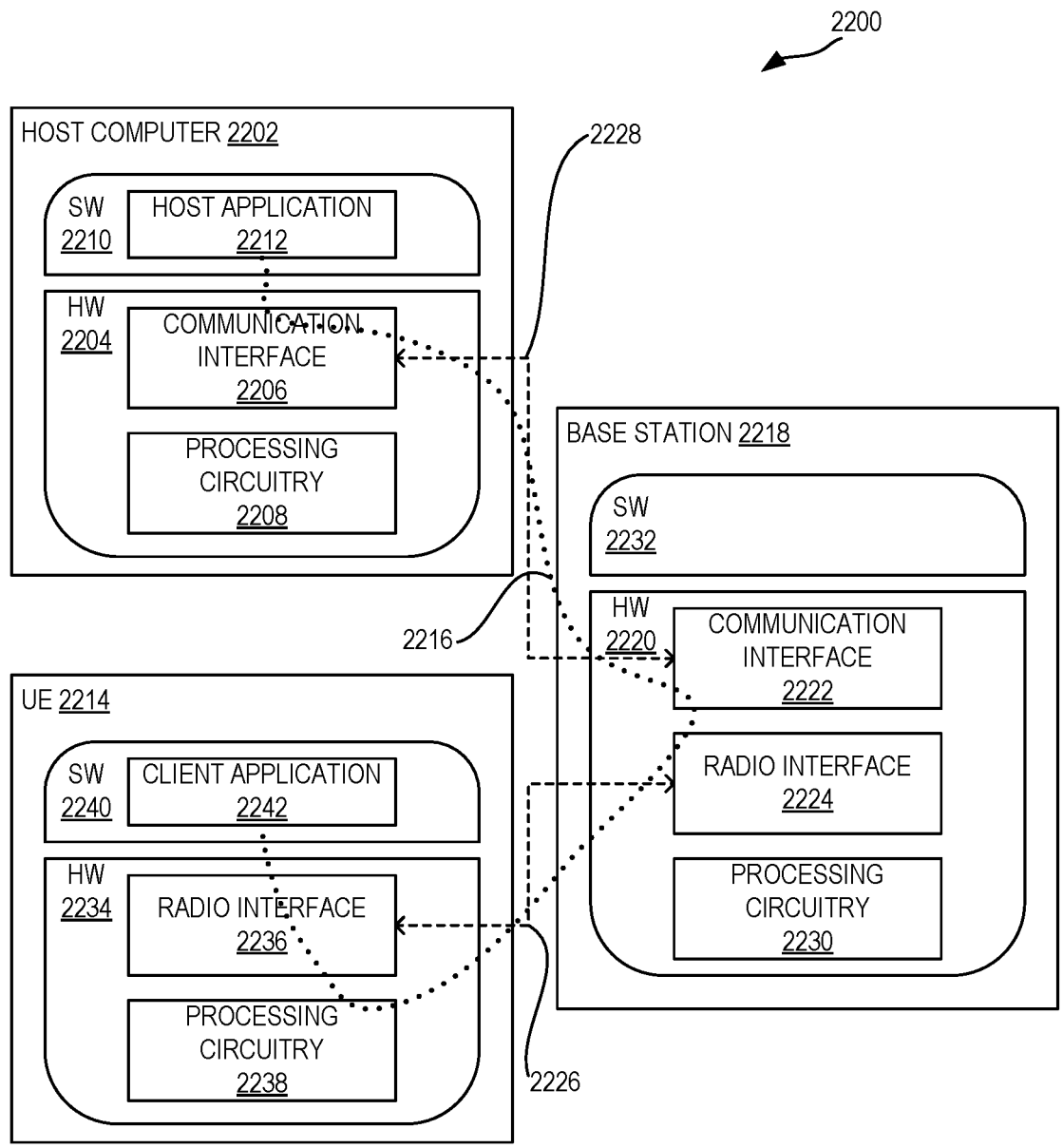

It is noted that the host computer 2202, the base station 2218, and the UE 2214 illustrated in FIG. 22 may be similar or identical to the host computer 2116, one of the base stations 2106A, 2106B, 2106C, and one of the UEs 2112, 2114 of FIG. 21, respectively. This is to say, the inner workings of these entities may be as shown in FIG. 22 and independently, the surrounding network topology may be that of FIG. 21.

In FIG. 22, the OTT connection 2216 has been drawn abstractly to illustrate the communication between the host computer 2202 and the UE 2214 via the base station 2218 without explicit reference to any intermediary devices and the precise routing of messages via these devices. The network infrastructure may determine the routing, which may be configured to hide from the UE 2214 or from the service provider operating the host computer 2202, or both. While the OTT connection 2216 is active, the network infrastructure may further take decisions by which it dynamically changes the routing (e.g., on the basis of load balancing consideration or reconfiguration of the network).

The wireless connection 2226 between the UE 2214 and the base station 2218 is in accordance with the teachings of the embodiments described throughout this disclosure. One or more of the various embodiments improve the performance of OTT services provided to the UE 2214 using the OTT connection 2216, in which the wireless connection 2226 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2216 between the host computer 2202 and the UE 2214, in response to variations in the measurement results. The measurement procedure and/or the network functionality for reconfiguring the OTT connection 2216 may be implemented in the software 2210 and the hardware 2204 of the host computer 2202 or in the software 2240 and the hardware 2234 of the UE 2214, or both. In some embodiments, sensors (not shown) may be deployed in or in association with communication devices through which the OTT connection 2216 passes; the sensors may participate in the measurement procedure by supplying values of the monitored quantities exemplified above, or supplying values of other physical quantities from which the software 2210, 2240 may compute or estimate the monitored quantities. The reconfiguring of the OTT connection 2216 may include message format, retransmission settings, preferred routing, etc.; the reconfiguring need not affect the base station 2218, and it may be unknown or imperceptible to the base station 2218. Such procedures and functionalities may be known and practiced in the art. In certain embodiments, measurements may involve proprietary UE signaling facilitating the host computer 2202's measurements of throughput, propagation times, latency, and the like. The measurements may be implemented in that the software 2210 and 2240 causes messages to be transmitted, in particular empty or 'dummy' messages, using the OTT connection 2216 while it monitors propagation times, errors, etc.

Figures 23, 24:
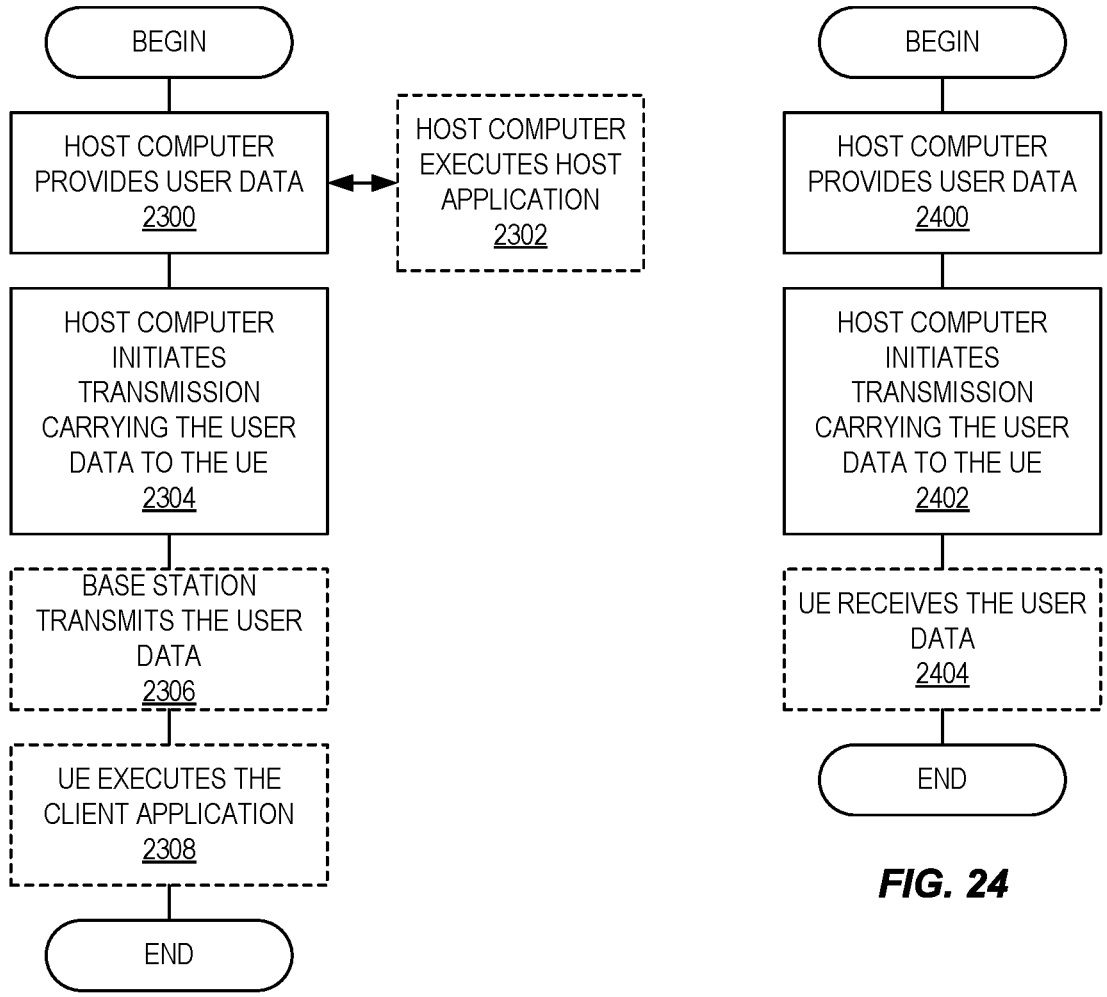
FIGS. 23 through 26 are flowcharts illustrating methods implemented in a communication system, according to some embodiments of the present disclosure.

FIG. 23 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 23 will be included in this section. In step 2300, the host computer provides user data. In sub-step 2302 (which may be optional) of step 2300, the host computer provides the user data by executing a host application. In step 2304, the host computer initiates a transmission carrying the user data to the UE. In step 2306 (which may be optional), the base station transmits to the UE the user data which was carried in the transmission that the host computer initiated, in accordance with the teachings of the embodiments described throughout this disclosure. In step 2308 (which may also be optional), the UE executes a client application associated with the host application executed by the host computer.

FIG. 24 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 24 will be included in this section. In step 2400 of the method, the host computer provides user data. In an optional sub-step (not shown) the host computer provides the user data by executing a host application. In step 2402, the host computer initiates a transmission carrying the user data to the UE. The transmission may pass via the base station, in accordance with the teachings of the embodiments described throughout this disclosure. In step 2404 (which may be optional), the UE receives the user data carried in the transmission.

Figures 25, 26:
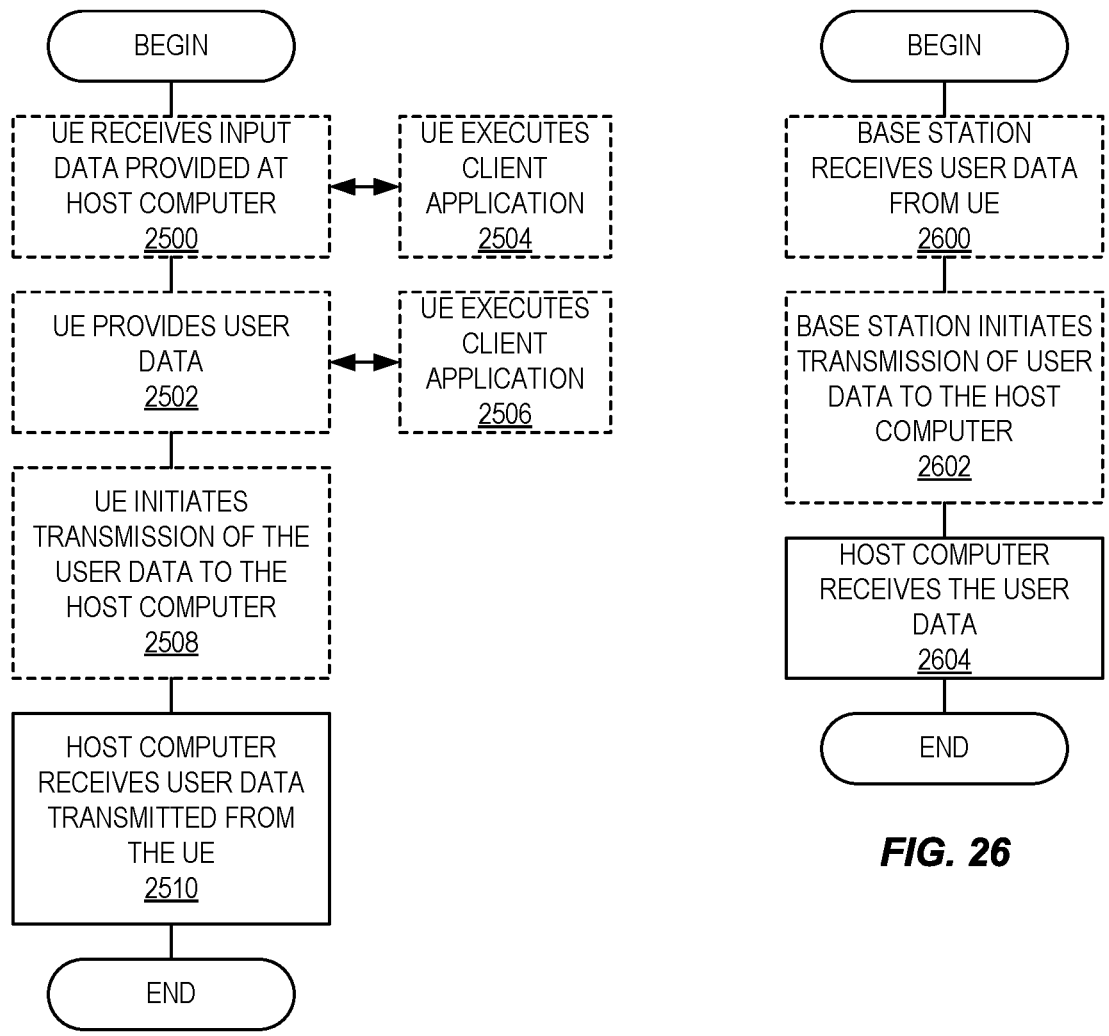

FIG. 25 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 25 will be included in this section. In step 2500 (which may be optional), the UE receives input data provided by the host computer. Additionally or alternatively, in step 2502, the UE provides user data. In sub-step 2504 (which may be optional) of step 2500, the UE provides the user data by executing a client application. In sub-step 2506 (which may be optional) of step 2502, the UE executes a client application which provides the user data in reaction to the received input data provided by the host computer. In providing the user data, the executed client application may further consider user input received from the user. Regardless of the specific manner in which the user data was provided, the UE initiates, in sub-step 2508 (which may be optional), transmission of the user data to the host computer. In step 2510 of the method, the host computer receives the user data transmitted from the UE, in accordance with the teachings of the embodiments described throughout this disclosure.

FIG. 26 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 26 will be included in this section. In step 2600 (which may be optional), in accordance with the teachings of the embodiments described throughout this disclosure, the base station receives user data from the UE. In step 2602 (which may be optional), the base station initiates transmission of the received user data to the host computer. In step 2604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may per-

Embodiments

Group A Embodiments

Embodiment 1: A method performed by a wireless device for transmitting a Channel State Information, CSI, report according to a timeline requirement, the method comprising one or more of: determining (1100) to enable timeline switching; receiving (1104), from a network node, an instruction to calculate a first CSI report; responsive to determining to enable timeline switching and receiving the instruction to calculate the first report, determining (1106) to stop calculating an existing ongoing second CSI report; calculating (1108) the first CSI report; and transmitting (1110), to the network node, the first CSI report.

Embodiment 2: The method of embodiment 1 further comprising the step of calculating (1102) the existing ongoing second CSI report for a certain duration in time.

Embodiment 3: The method of any of embodiments 1 to 2 wherein the first CSI report has a lower latency requirement than the second CSI report.

Embodiment 4: The method of any of embodiments 1 to 3 wherein determining to enable timeline switching comprises receiving, from the network node, a higher layer configuration to enable timeline switching.

Embodiment 5: The method of any of embodiments 1 to 4 wherein receiving the instruction to calculate the first CSI report comprises receiving the instruction to calculate the first CSI report from Downlink Control Information, DCI, signaling.

Embodiment 6: The method of any of embodiments 1 to 5 wherein the higher layer configuration to enable timeline switching is received explicitly or implicitly.

Embodiment 7: The method of any of embodiments 1 to 4 wherein determining to enable timeline switching comprises determining to enable timeline switching based on the received instruction to calculate the first CSI report.

Embodiment 8: The method of any of embodiments 1 to 7 wherein: receiving the instruction to calculate the first CSI report comprises a slot offset $K_2$ that indicates when to report the first CSI report; and/or determining to stop calculating the existing ongoing second CSI report comprises determining to suspend calculation of the existing ongoing second CSI report.

Embodiment 9: The method of any of embodiments 1 to 8 further comprising: resuming (1112) the second CSI report.

Embodiment 10: The method of embodiment 9 wherein resuming the second CSI report comprises resuming the second CSI report based on a modified timeline criterion that depends on the slot offset $K_2$.

Embodiment 11: The method of any of embodiments 8 to 10 wherein the slot offset $K_2$ indicates when to report the first CSI report on Physical Uplink Shared Channel, PUSCH, relative to the instruction to calculate the first CSI report.

Embodiment 12: The method of any of any of embodiments 1 to 11 wherein the first CSI report comprises an Ultra-Reliable Low-Latency Communication, URLLC, CSI report.

Embodiment 13: The method of any of the previous embodiments, further comprising: providing user data; and forwarding the user data to a host computer via the transmission to the base station.

Group B Embodiments

Embodiment 14: A method performed by a base station for receiving a Channel State Information, CSI, report according to a timeline requirement, the method comprising one or more of: determining (1200) to enable timeline switching; transmitting (1202), to a wireless device, an instruction to calculate a first CSI report; and receiving (1204), from the wireless device, the first CSI report, where the wireless device stopped calculating an existing ongoing second CSI report.

Embodiment 15: The method of embodiment 14 wherein the first CSI report has a lower latency requirement than the second CSI report.

Embodiment 16: The method of any of embodiments 14 to 15 wherein determining to enable timeline switching comprises transmitting, to the wireless device, a higher layer configuration to enable timeline switching.

Embodiment 17: The method of any of embodiments 14 to 16 wherein transmitting the instruction to calculate the first CSI report comprises transmitting the instruction to calculate the first CSI report from Downlink Control Information, DCI, signaling.

Embodiment 18: The method of embodiments 14 to 17 wherein: transmitting the instruction to calculate the first CSI report comprises a slot offset $K_2$ that indicates when to report the first CSI report.

Embodiment 19: The method of any of embodiments 14 to 18 further comprising: receiving (1206), from the wireless device, the second CSI report.

Embodiment 20: The method of embodiment 19 wherein receiving the second CSI report comprises receiving the second CSI report based on a modified timeline criterion that depends on the slot offset $K_2$.

Embodiment 21: The method of any of embodiments 18 to 20 wherein the slot offset $K_2$ indicates when to report the first CSI report on Physical Uplink Shared Channel, PUSCH, relative to the instruction to calculate the first CSI report.

Embodiment 22: The method of any of embodiments 14 to 21 wherein the first CSI report comprises an Ultra-Reliable Low-Latency Communication, URLLC, CSI report.

Embodiment 23: The method of any of the previous embodiments, further comprising: obtaining user data; and forwarding the user data to a host computer or a wireless device.

Group C Embodiments

Embodiment 24: A wireless device for transmitting a Channel State Information, CSI, report according to a timeline requirement, the wireless device comprising: processing circuitry configured to perform any of the steps of any of the Group A embodiments; and power supply circuitry configured to supply power to the wireless device.

Embodiment 25: A base station for receiving a Channel State Information, CSI, the base station comprising: processing circuitry configured to perform any of the steps of any of the Group B embodiments; and power supply circuitry configured to supply power to the base station.

Embodiment 26: A User Equipment, UE, for transmitting a Channel State Information, CSI, report according to a timeline requirement, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 27: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 28: The communication system of the previous embodiment further including the base station.

Embodiment 29: The communication system of the previous 2 embodiments, further including the UE, wherein the UE is configured to communicate with the base station.

Embodiment 30: The communication system of the previous 3 embodiments, wherein: the processing circuitry of the host computer is configured to execute a host application, thereby providing the user data; and the UE comprises processing circuitry configured to execute a client application associated with the host application.

Embodiment 31: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 32: The method of the previous embodiment, further comprising, at the base station, transmitting the user data.

Embodiment 33: The method of the previous 2 embodiments, wherein the user data is provided at the host computer by executing a host application, the method further comprising, at the UE, executing a client application associated with the host application.

Embodiment 34: A User Equipment, UE, configured to communicate with a base station, the UE comprising a radio interface and processing circuitry configured to perform the method of the previous 3 embodiments.

Embodiment 35: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 36: The communication system of the previous embodiment, wherein the cellular network further includes a base station configured to communicate with the UE.

Embodiment 37: The communication system of the previous 2 embodiments, wherein: the processing circuitry of the host computer is configured to execute a host application, thereby providing the user data; and the UE's processing circuitry is configured to execute a client application associated with the host application.

Embodiment 38: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 39: The method of the previous embodiment, further comprising at the UE, receiving the user data from the base station.

Embodiment 40: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 41: The communication system of the previous embodiment, further including the UE.

Embodiment 42: The communication system of the previous 2 embodiments, further including the base station, wherein the base station comprises a radio interface configured to communicate with the UE and a communication interface configured to forward to the host computer the user data carried by a transmission from the UE to the base station.

Embodiment 43: The communication system of the previous 3 embodiments, wherein: the processing circuitry of the host computer is configured to execute a host application; and the UE's processing circuitry is configured to execute a client application associated with the host application, thereby providing the user data.

Embodiment 44: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 45: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 46: The method of the previous embodiment, further comprising, at the UE, providing the user data to the base station.

Embodiment 47: The method of the previous 2 embodiments, further comprising: at the UE, executing a client application, thereby providing the user data to be transmitted; and at the host computer, executing a host application associated with the client application.

Embodiment 48: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 49: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 50: The communication system of the previous embodiment further including the base station.

Embodiment 51: The communication system of the previous 2 embodiments, further including the UE, wherein the UE is configured to communicate with the base station.

Embodiment 52: The communication system of the previous 3 embodiments, wherein: the processing circuitry of the host computer is configured to execute a host application; and the UE is configured to execute a client application associated with the host application, thereby providing the user data to be received by the host computer.

Embodiment 53: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 54: The method of the previous embodiment, further comprising at the base station, receiving the user data from the UE.

Embodiment 55: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
A/N Acknowledgement/Negative Acknowledgement
AF Application Function
AMF Access and Mobility Function
AN Access Network
AP Access Point
ASIC Application Specific Integrated Circuit
AUSF Authentication Server Function
BWP Bandwidth Part
CoMP Coordinated Multi-Point
CPU CSI Processing Unit
CQI Channel Quality Indication
CRI CSI-RS Resource Indicator
CSI Channel State Information
CSI-RS Channel State Information Reference Signal
CSI-RS/IM CSI-RS Interference Management
DCI Downlink Control Information
DFT Discrete Fourier Transform
DL Downlink
DN Data Network
DSP Digital Signal Processor
eNB Enhanced or Evolved Node B
FPGA Field Programmable Gate Array
gNB New Radio Base Station
gNB-CU New Radio Base Station Central Unit
gNB-DU New Radio Base Station Distributed Unit
HARQ-ACK Hybrid Automatic Repeat Request Acknowledgement
HLCR High Latency CSI Report
HSS Home Subscriber Server
IM Interference Management
IMR Interference Measurement Resource
IoT Internet of Things
IP Internet Protocol
LTE Long Term Evolution
MCS Modulation and Coding Scheme
MIMO Multiple Input Multiple Output
MME Mobility Management Entity
MTC Machine Type Communication
NEF Network Exposure Function
NF Network Function
NR New Radio
NRF Network Function Repository Function
NSSF Network Slice Selection Function
NZP Non-Zero Power
OFDM Orthogonal Frequency Division Multiplexing
OTT Over-the-Top
PC Personal Computer
PCF Policy Control Function
PDCCH Physical Downlink Control Channel
P-GW Packet Data Network Gateway
PMI Precoding Matrix Indicator
PUCCH Physical Uplink Control Channel
PUSCH Physical Uplink Shared Channel
QoS Quality of Service
RAM Random Access Memory
RAN Radio Access Network
RB Resource Block
RI Rank Indicator
ROM Read Only Memory
RRC Radio Resource Control
RRH Remote Radio Head
RTT Round Trip Time
SCEF Service Capability Exposure Function
SCS Subcarrier Spacing
SMF Session Management Function
TFRE Time/Frequency Resource Element
TRS Tracking Reference Signal
UCI Uplink Channel Information
UDM Unified Data Management
UE User Equipment
UL Uplink
ULCR URLLC CSI Report
UPF User Plane Function
URLLC Ultra Reliable Low Latency Communication Those skilled in the art will recognize improvements and modifications to the embodiments of the present disclosure. All such improvements and modifications are considered within the scope of the concepts disclosed herein.

What is claimed is:

1. A method performed by a wireless device for transmitting a Channel State Information, CSI, report according to a timeline requirement, the method comprising one or more of:
   determining to enable timeline switching;
   receiving, from a network node, an instruction to determine a first CSI report;
   responsive to determining to enable timeline switching and receiving the instruction to determine the first CSI report, determining to stop determining an existing ongoing second CSI report;
   determining the first CSI report; and
   transmitting, to the network node, the first CSI report.

2. The method of claim 1 further comprising:
   determining the existing ongoing second CSI report for a certain duration in time.

3. The method of claim 1 wherein the first CSI report has a lower latency requirement than the existing ongoing second CSI report.

4. The method of claim 1 wherein determining to enable timeline switching comprises:
receiving, from the network node, a higher layer configuration to enable timeline switching.

5. The method of claim 4 wherein the higher layer configuration is one of a CSI report configuration and an aperiodic CSI trigger state associated with the first CSI report.

6. The method of claim 4 wherein the higher layer configuration to enable timeline switching is received explicitly or implicitly.

7. The method of claim 1 wherein receiving the instruction to determine the first CSI report comprises receiving the instruction to determine the first CSI report from Downlink Control Information, DCI, signaling.

8. The method of claim 1 wherein determining to enable timeline switching comprises determining to enable timeline switching based on the received instruction to determine the first CSI report.

9. The method of claim 1 wherein:
receiving the instruction to determine the first CSI report comprises a slot offset $K_2$ that indicates when to report the first CSI report; and/or
determining to stop determining the existing ongoing second CSI report comprises determining to suspend determination of the existing ongoing second CSI report.

10. The method of claim 9 wherein the slot offset $K_2$ indicates when to report the first CSI report on a Physical Uplink Shared Channel, PUSCH, relative to the instruction to determine the first CSI report.

11. The method of claim 1 further comprising:
resuming the second CSI report.

12. The method of claim 11 wherein resuming the second CSI report comprises resuming the second CSI report based on a modified timeline criterion that depends on a slot offset $K_2$.

13. The method of claim 1 wherein the first CSI report comprises an Ultra-Reliable Low-Latency Communication, URLLC, CSI report.

14. The method of claim 1 wherein the wireless device operates in a New Radio, NR, communications network.

15. A method performed by a base station for receiving a Channel State Information, CSI, report according to a timeline requirement, the method comprising one or more of:
configuring a wireless device with a first and a second aperiodic trigger state, and associated a first and a second CSI report configuration, respectively;
determining to enable timeline switching;
transmitting, to the wireless device, an instruction to determine the first CSI report and to stop or suspend determining a second ongoing CSI report; and
receiving, from the wireless device, the first CSI report.

16. The method of claim 15 wherein the first CSI report has a lower latency requirement than the existing ongoing second CSI report.

17. The method of claim 15 wherein determining to enable timeline switching comprises transmitting, to the wireless device, a higher layer configuration to enable timeline switching.

18. The method of claim 17 wherein the higher layer configuration is one of the first CSI report configuration and the first aperiodic CSI trigger state.

19. A wireless device for transmitting a Channel State Information, CSI, report according to a timeline requirement, the wireless device comprising:
one or more processors; and
memory storing instructions executable by the one or more processors, whereby the wireless device is operable to perform one or more of:
determine to enable timeline switching;
receive, from a network node, an instruction to determine a first CSI report;
responsive to determining to enable timeline switching and receiving the instruction to determine the first CSI report, determine to stop determining an existing ongoing second CSI report;
determine the first CSI report; and
transmit, to the network node, the first CSI report.

20. A base station for receiving a Channel State Information, CSI, report according to a timeline requirement, the base station comprising:
one or more processors; and
memory comprising instructions to cause the base station to perform one or more of:
configuring a wireless device with a first and a second aperiodic trigger state, and an associated first and a second CSI report configuration, respectively;
determine to enable timeline switching;
transmit, to a wireless device, an instruction to determine a first CSI report and to stop or suspend determining a second ongoing CSI report; and
receive, from the wireless device, the first CSI report.

* * * * *